United States Patent
McClory et al.

(10) Patent No.: US 10,521,284 B2
(45) Date of Patent: Dec. 31, 2019

(54) SYSTEM AND METHOD FOR MANAGEMENT OF DEPLOYED SERVICES AND APPLICATIONS

(71) Applicant: Datapipe, Inc., Jersey City, NJ (US)

(72) Inventors: Thomas Patrick McClory, Carlsbad, CA (US); Jatil Chandrakant Damania, Jersey City, NJ (US); Scott Matthew Vidmar, Graham, WA (US)

(73) Assignee: Datapipe, Inc., Jersey City, NJ (US)

(*) Notice: Subject to any disclaimer, the term of this patent is extended or adjusted under 35 U.S.C. 154(b) by 0 days.

(21) Appl. No.: 15/695,988

(22) Filed: Sep. 5, 2017

(65) Prior Publication Data

US 2018/0321993 A1 Nov. 8, 2018

Related U.S. Application Data

(60) Provisional application No. 62/503,079, filed on May 8, 2017.

(51) Int. Cl.
*G06F 9/54* (2006.01)
*G06F 9/50* (2006.01)
(Continued)

(52) U.S. Cl.
CPC ............... *G06F 9/546* (2013.01); *G06F 8/30* (2013.01); *G06F 8/41* (2013.01); *G06F 8/60* (2013.01);
(Continued)

(58) Field of Classification Search
CPC ............. H04L 63/0236; H04L 63/0281; H04L 63/1433; H04L 67/10; G06F 8/30;
(Continued)

(56) References Cited

U.S. PATENT DOCUMENTS 9,485,303 B2   11/2016   Lee et al.
10,013,239 B2   7/2018   Zhang et al.
(Continued)

OTHER PUBLICATIONS

Tsai, Wei-Tek, Yu Huang, and Qihong Shad. "EasySaaS: A SaaS development framework." Service-oriented computing and applications (SOCA), 2011 IEEE International Conference on SOCA. IEEE, 2011.
(Continued)

*Primary Examiner* — Charles E Anya
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for processing requests for a deployed service or application. According to an embodiment, a request for a service may be received by a command application programming interface (API) from a client device. A request identifier and a task message specifying a task to be performed by the service may be generated based on the received request. A read cache may be updated with the request identifier, and the task message may be transmitted to a command task queue. A worker process may detect the task message upon transmission of the task message to the command queue and execute the task specified by the task message. Upon completion of the task, a completion message may be transmitted to an event publish queue.

20 Claims, 9 Drawing Sheets

(51) Int. Cl.

| | | |
|---|---|---|
| *H04L 29/06* | (2006.01) | |
| *G06F 8/30* | (2018.01) | |
| *G06F 8/41* | (2018.01) | |
| *G06F 8/60* | (2018.01) | |
| *G06F 8/71* | (2018.01) | |
| *G06F 11/36* | (2006.01) | |
| *G06F 9/455* | (2018.01) | |
| *G06Q 10/06* | (2012.01) | |
| *H04L 12/24* | (2006.01) | |
| *H04L 29/08* | (2006.01) | |
| *G06F 8/77* | (2018.01) | |

(52) U.S. Cl.
CPC ............ *G06F 8/71* (2013.01); *G06F 9/45558* (2013.01); *G06F 9/505* (2013.01); *G06F 9/5027* (2013.01); *G06F 11/3684* (2013.01); *G06F 11/3688* (2013.01); *G06Q 10/06398* (2013.01); *H04L 41/5041* (2013.01); *H04L 41/5054* (2013.01); *H04L 63/0236* (2013.01); *H04L 63/0281* (2013.01); *G06F 8/77* (2013.01); *G06F 2009/45583* (2013.01); *G06F 2009/45587* (2013.01); *G06F 2009/45591* (2013.01); *G06F 2209/501* (2013.01); *G06F 2209/541* (2013.01); *G06F 2209/548* (2013.01); *H04L 41/5083* (2013.01); *H04L 63/1433* (2013.01); *H04L 67/10* (2013.01)

(58) Field of Classification Search
CPC ..... G06F 8/41; G06F 8/60; G06F 8/71; G06F 11/3684; G06F 11/3688; G06F 9/45558; G06F 9/5027; G06F 9/546; G06F 9/505; G06F 8/77; G06F 2009/45583; G06F 2009/45591; G06F 2209/541; G06F 2209/548; G06F 2209/501; G06Q 10/06398
See application file for complete search history.

(56) References Cited

U.S. PATENT DOCUMENTS

| | | |
|---|---|---|
| 2002/0133504 A1 | 9/2002 | Vlahos et al. |
| 2010/0241722 A1 | 9/2010 | Seminaro et al. |
| 2013/0007183 A1* | 1/2013 | Sorenson, III ........ G06F 3/0607 709/213 |
| 2014/0130056 A1* | 5/2014 | Goodman ............ G06F 9/5044 718/104 |
| 2014/0280658 A1* | 9/2014 | Boling .................... H04L 51/16 709/207 |
| 2014/0282421 A1 | 9/2014 | Jubran et al. |
| 2014/0344672 A1 | 11/2014 | Kapoor |
| 2014/0351686 A1* | 11/2014 | Yawn .................... G06F 17/248 715/230 |
| 2015/0172148 A1 | 6/2015 | Ishida et al. |
| 2015/0186132 A1 | 7/2015 | Oliveri et al. |
| 2016/0019300 A1 | 1/2016 | Dove et al. |
| 2016/0092179 A1 | 3/2016 | Straub |
| 2016/0092297 A1* | 3/2016 | Mazon .................... H04L 67/28 714/15 |
| 2016/0127254 A1* | 5/2016 | Kumar .................... H04L 47/70 709/226 |
| 2016/0357660 A1 | 12/2016 | Dean et al. |
| 2017/0004185 A1 | 1/2017 | Zhu et al. |
| 2017/0131974 A1 | 5/2017 | Balasubramanian et al. |
| 2017/0180289 A1* | 6/2017 | Chiappone ............. H04L 67/22 |
| 2017/0195386 A1 | 7/2017 | Nathan et al. |
| 2018/0027051 A1 | 1/2018 | Parees et al. |
| 2018/0074973 A1 | 3/2018 | Chan et al. |
| 2018/0089328 A1 | 3/2018 | Bath et al. |
| 2018/0181376 A1 | 6/2018 | Balasubramanian et al. |
| 2018/0262592 A1 | 9/2018 | Zandi et al. |
| 2018/0321918 A1 | 11/2018 | McClory et al. |
| 2018/0321979 A1* | 11/2018 | Bahramshahry ...... G06F 9/5038 |
| 2018/0322437 A1 | 11/2018 | McClory et al. |
| 2018/0324204 A1 | 11/2018 | McClory et al. |

OTHER PUBLICATIONS

Non-Final Office Action directed to U.S. Appl. No. 15/655,128, dated Dec. 13, 2018, 24 pages.

Non-Final Office Action directed to U.S. Appl. No. 15/617,428, dated Sep. 17, 2018, 13 pages.

Final Office Action directed to U.S. Appl. No. 15/617,428, dated Jun. 13, 2019, 23 pages.

\* cited by examiner

SYSTEM AND METHOD FOR MANAGEMENT OF DEPLOYED SERVICES AND APPLICATIONS

CROSS REFERENCE TO RELATED APPLICATION

This application claims the benefit of priority to U.S. Provisional Application No. 62/503,079, filed on May 8, 2017, which is herein incorporated by reference in its entirety.

BACKGROUND

Field

This disclosure is generally directed to management of services and applications deployed within a computing infrastructure.

Background

The transition of the traditional physical infrastructure to a service-oriented architecture has allowed application developers to focus more on the development of their applications rather than maintaining their own physical infrastructure. However, to meet demands from internal and external customers (e.g., high availability, incremental improvements, etc.), the ability to rapidly troubleshoot, fix, iterate, and update deployed applications have become a necessity. Accordingly, new solutions and mechanisms for managing services and applications accessible to consumers and service operators are required to ensure performance, availability, and reliability across multiple related services.

SUMMARY

Provided herein are system, apparatus, article of manufacture, method and/or computer program product embodiments, and/or combinations and sub-combinations thereof, for processing requests for a deployed service or application.

According to an embodiment, a request for a service may be received by a command application programming interface (API) from a client device. A request identifier and a task message specifying a task to be performed by the service may be generated based on the received request. A read cache may be updated with the request identifier, and the task message may be transmitted to a command task queue. A worker process may detect the task message upon transmission of the task message to the command queue and execute the task specified by the task message. Upon completion of the task, a completion message may be transmitted to an event publish queue.

In an embodiment, a status of the task specified by the task message may be periodically transmitted to the read queue. A status request including the request identifier may be received by a read API, and the status from the read queue may be retrieved in response to receiving the status request. The retrieved status may then be transmitted to the client device.

In an embodiment, a request for data provided by the service may also be received by the read API. Credentials associated with the request may be validated to determine whether the request is authorized to access the requested data, and a format of the request may be verified to determine whether the request meets predefined format requirements. The requested data may then be retrieved from the read cache and/or a service data store when the requested data does not reside in the read cache. Finally, the requested data may be formatted in accordance with a service contract and transmitted to the requester.

Further embodiments, features, and advantages of the disclosure, as well as the structure and operation of the various embodiments, are described in detail below with reference to accompanying drawings.

BRIEF DESCRIPTION OF THE FIGURES

The accompanying drawings are incorporated herein and form a part of the specification.

Figure 1:
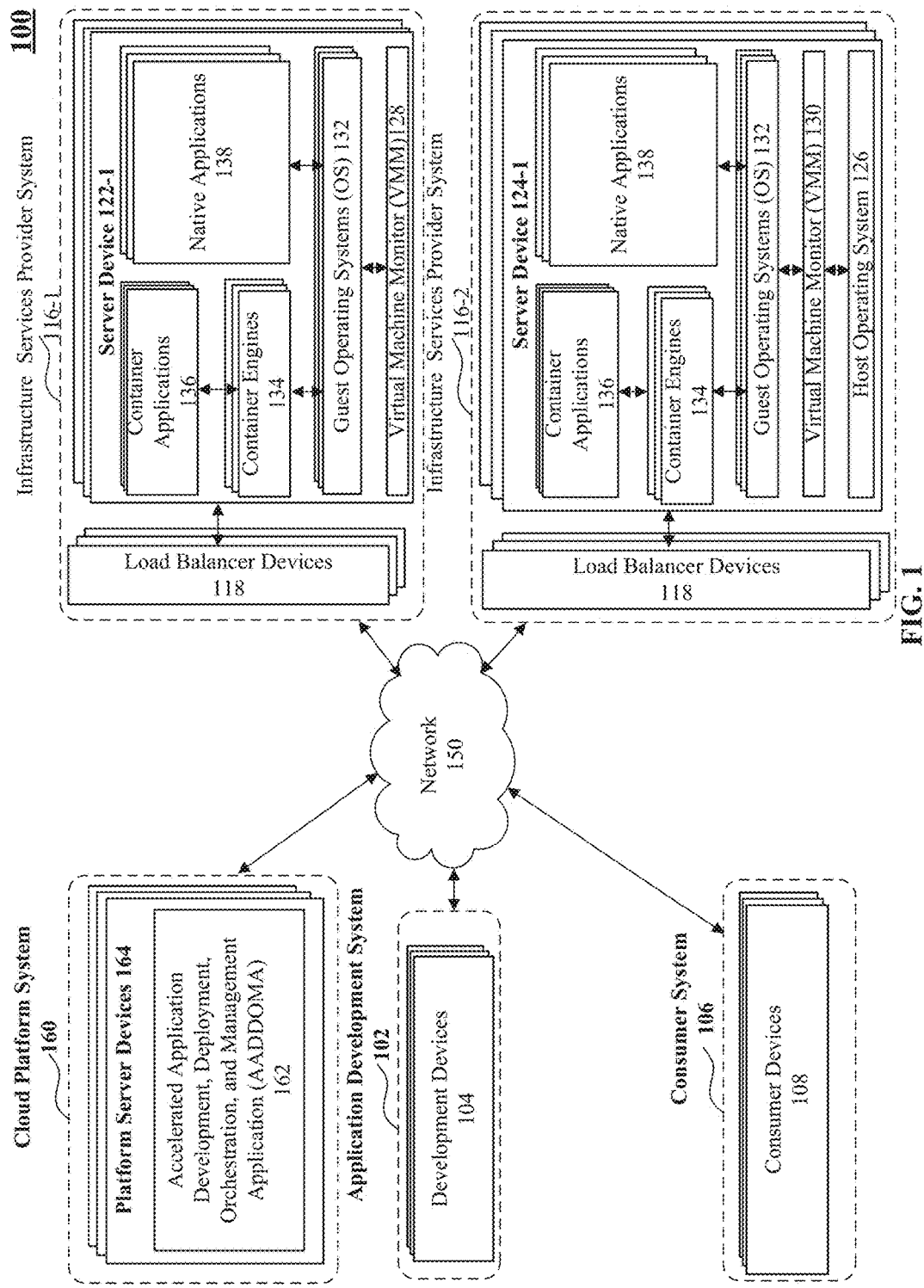
FIG. 1 illustrates a block diagram of Accelerated Application Development, Deployment, Orchestration, and Management System (AADDOMS) in an example embodiment.

Like reference numerals refer to corresponding parts throughout the several views of the drawings. Additionally, generally, the left-most digit(s) of a reference number identifies the drawing in which the reference number first appears. Furthermore, one or more designators to the right of a reference number such as, for example, "m" and "n" and other similar designators are intended to be variables representing any positive integer. Thus, for example, if an implementation sets a value for n=4, then a complete set of elements 116-n may include elements 116-1, 116-2, 116-3, and 116-4. Furthermore, unless explicitly stated otherwise, a complete set of elements may vary for a given feature, embodiment, and/or implementation even though the same designator may be used between various features, embodiments, and/or implementations.

DETAILED DESCRIPTION

With the availability of IaaS providers, application developers are no longer required to setup, maintain, and update their own physical infrastructure (e.g., server devices, network devices, storage devices, etc.) that host their applications and provide services to their customers. While such a transition of the traditional physical infrastructure to a microservices-based or cloud-native architecture allowed application developers to focus more on the development of their applications rather than maintaining their own physical infrastructure, new solutions and mechanisms are required to enable organizations and their application developers to architect, design, build, test, and deploy their applications to the various IaaS providers. Furthermore, the initial deployment of an application is typically only the beginning of the application's life cycle. In order to meet demands from internal and external customers (e.g., high availability, incremental improvements, etc.), the ability to rapidly troubleshoot, fix, iterate, and update deployed applications have become a necessity.

While existing solutions enable the application developers to accomplish some of these functionalities (e.g., deployment of their applications, testing of their applications, etc.), many of these functionalities are fragmented in various different solutions. Furthermore, extensive knowledge, configuration, and modifications of these different solutions are also typically required in order to create, develop, test, and deploy an application to an infrastructure services provider. This is often implemented with little consistency, and there is a lack of a dedicated management method. And even with such configurations and modifications, the existing solutions do not enable an application developer to: (1) quickly create an application with a customizable development pipeline that incorporate the best development practices, (2) rapidly build, test, and deploy their application on a continuous basis to their desired infrastructure services providers; (3) monitor, access, and receive alerts regarding performance of their deployed applications, and (4) provide authentication, authorization, access control, and/or accounting with respect to their deployed applications in an integrated solution.

FIG. 1 illustrates a block diagram of the AADDOMS 100 that provides an integrated solution that enables application developers to achieve these and other functionalities according to an example embodiment. In particular, the AADDOMS 100 may include a cloud platform system 160, application development system 102, consumer system 106, and infrastructure services provider systems 116, where each of these systems may be operatively and communicatively coupled via network 150.

In various embodiments, the network 150 may be representative of one or more computer and/or telecommunications networks that may enable coupled and/or interconnected systems and/or devices to communicate information between and among each other. In various embodiments, the network 150 may include, without limitation, intranet, extranet, Internet, and/or any other local, regional, global telecommunications network.

In various embodiments, the network 150 may include various wireless network devices configured to encode and/or decode information and receive and/or transmit the encoded information as radio signals in frequencies consistent with the one or more wireless communications standards (e.g., Wireless IEEE 802.11, WiMAX IEEE 802.16, Global Systems for Mobile Communications (GSM), Enhanced Data Rates for GSM Evolution (EDGE), Long Term Evolution (LTE), Bluetooth standards, Near Field Communications (NFC) standards, etc.). Additionally or alternatively, the network 150 may also include various wired network devices configured to receive and/or transmit the encoded information as electrical and/or optical signals consistent with one or more wired and/or optical network standards (e.g., Ethernet, Fibre Channel, etc.).

In an embodiment, the cloud platform system 160 may be representative of a system generally arranged to provide application developers with accelerated development, deployment, orchestration, and management of their container applications 136 and/or native applications 138. For example, the cloud platform system 160 may provide application developers with the functionality to rapidly design, create, build, test, and/or deploy their container applications 136 and/or native applications 138 to the respective infrastructure services provider systems 116. The services of the deployed container applications 136 and/or native applications 138 may then be accessed or used by the application developer's customers, clients, or consumers via their systems (e.g., consumer system 106).

In an embodiment, the one or more container applications 136 and/or native applications 138 may also implement a microservice architecture, where the structures of an application may be implemented as a set of individual microservices that are separated and organized by their discrete functions. In an embodiment, the individual microservices may be implemented with a variety of programming languages (e.g., Java, JavaScript, C#, C++, Python, PHP, Ruby, Go, Perl, and Erlang, Node.js, Elixir, etc.) and may be communicatively and/or operatively coupled to each other via distributed messaging systems (e.g., APACHE Kafka, PIVOTAL RabbitMQ, etc.) and overlay networks (e.g., flannel, WEAVE Net, Project Calico, etc.) to collectively provide the functionalities of the application. The individual microservices may also be independently built, tested, and deployed to facilitate continuous integration (CI) and continuous delivery (CD) software development and information technology operations (DevOps) paradigm(s).

In an embodiment, the cloud platform system 160 may also provide application developers with the functionality to continuously update, build, test, and deploy their container applications 136 and/or native applications 138 including one or more individual microservices to the respective infrastructure services provider systems 116. Additionally or alternatively, the cloud platform system 160 may further provide telemetry information (e.g., metrics, logs, etc.) to the application developers and enable application developers to manage authentication, authorization, and access control of their container applications 136 and/or native applications 138.

To enable these and other functionalities, the cloud platform system 160 may include one or more platform server devices 164 generally arranged to host an AADDOMA 162. In an embodiment, the AADDOMA 162 may be configured to provide these functionalities to the application developers via one or more command line interfaces (CLIs) and/or graphical user interfaces (GUIs), which may include, without limitation, web-based GUIs, client-side GUIs, or any other GUI that provide these functionalities to an application developer. In addition to CLIs and GUIs, the AADDOMA 162 may be further configured to provide one or more programmatic interfaces (e.g., Application Programming Interfaces (APIs), etc.) accessible by the application developers via customized applications, CLIs, and/or GUIs. In an embodiment, the APIs may be designed in accordance with one or more programming paradigms (e.g., Design-by-Contract (DbC), etc.).

In an embodiment, the application development system 102 may be representative of an example system of individuals, corporations, organizations or other entities for the development of applications hosted by the infrastructure services provider systems 116. The application development system 102 may include, without limitation, one or more development devices 104 (e.g., development devices 104-1, 104-2, 104-3, etc.) used by application developers to develop various applications including, for example, their associated microservices (if any).

For example, the one or more development devices 104 may be representative of workstations used by application developers to create one or more container applications 136 and/or native applications 138. Continuing with the example, the one or more development devices 104 may also include, without limitation, various software development applications such as, for example, one or more source code editors, compilers, linkers, debuggers, source code analyzers, source code management systems, asset repositories, and/or Integrated Development Environments (IDE).

In an embodiment, the one or more development devices 104 may further include one or more CLI and/or GUI based applications configured to communicate and utilize the various functionalities provided by the AADDOMA 162 via network 150. For example, the one or more development devices 104 may be configured to determine application creation configuration information based on one or more answers to questions provided by application developers via a CLI and/or GUI based application (e.g., application orchestration client application 214 further discussed in FIG. 2). Continuing with the previous example, the CLI based application may be operatively and communicatively coupled to the one or more programmatic interfaces of the AADDOMA 162 and transmit the application creation configuration information to the AADDOMA 162. The AADDOMA 162 may receive application creation configuration information from the one or development devices 104. And in response, the AADDOMA 162 may create, build, test, and deploy one or more container applications 136 and/or native applications 138 to a designated infrastructure services provider system such as infrastructure services provider system 116-1. In an embodiment, the application creation configuration information may be determined using just a few pieces of data, which can be obtained from the application developer by asking simple questions, such as software architecture information of the application and the development stack information associated with the application. Once deployed, the container applications 136 and/or native applications 138 may execute on the infrastructure services provider system 116-1 and provide services to the consumer system 106.

It may be appreciated that by using the AADDOMA 162, application developers may continuously deploy their applications with certainty and consistency validated by built in, frequent, recurring, automated, and configurable testing. By using the AADDOMA 162, extensive knowledge and modifications of existing solutions are no longer necessary to create and deploy applications to infrastructure services providers. Moreover, the AADDOMA 162 may provide application developers with a base infrastructure that is scalable and responsive, and available when needed. The AADDOMA 162 may also allow application developers to assess the performance of their applications and provide proactive triggers. The AADDOMA 162 may further ensure that the application developers have controlled access and that their applications are protected. These are merely a few of the benefits of the AADDOMA 162, as further benefits and advantages will be further discussed.

In an embodiment, the consumer system 106 may be representative of typical consumer devices used by clients, consumers, developers, and/or other end users of a deployed application. In particular, the consumer system 106 may include one or more consumer devices 108 (e.g., consumer devices 108-1, 108-2, 108-3, etc.) that may be operatively and/or communicatively coupled to the container applications 136 and/or native applications 138 to provide its end users with various services via network 150. For example, the one or more consumer devices 108 may be representative of Internet of Things (IoT) devices (e.g., Internet capable appliances, Internet capable thermostats, etc.), mobile devices (e.g., mobile phones, tablets, laptop computers, etc.), embedded devices (e.g., 3D printers, home security devices, vehicle navigation devices, etc.), computing devices (e.g., workstations, desktop computers, etc.) or any other electronic devices that rely on the services provided by the one or more container applications 136 and/or native applications 138.

In an embodiment, the infrastructure services provider systems 116 may be representative of various data centers of cloud computing services providers (e.g., MICROSOFT Azure, AMAZON Web Services, GOOGLE Compute Engine, ALIBABA Cloud, etc.), each implementing a variety of protocols (e.g., Hyper Text Transfer Protocol (HTTP), HTTP Secure (HTTPS), etc.), standard formats (e.g., JavaScript Object Notation (JSON), Extensible markup Language (XML), etc.), and/or APIs (e.g., MICROSOFT Services Management APIs, AMAZON Elastic Compute Cloud APIs, GOOGLE Cloud JSON APIs, etc.). Additionally or alternatively, in some embodiments, the infrastructure services provider systems 116 may be representative of data centers internal or external (e.g., DATAPIPE data centers, etc.) to an application developer's organization configured to provide cloud computing services.

In some embodiments, the infrastructure services provider systems 116 may be geographically separated (e.g., separate physical locations, etc.) and virtually separated (e.g., separate network domains, etc.). In other embodiments, the infrastructure services provider systems 116 may be substantially geographically co-located (e.g., in substantially the same physical location, etc.) and virtually connected (e.g., in the same network domain, etc.). Alternatively, in some embodiments, the infrastructure services provider systems 116 may be geographically separated yet virtually connected or substantially geographically co-located yet virtually separated.

In an embodiment, the infrastructure services provider systems 116 may optionally include one or more load balancer devices 118 operatively and communicatively coupled to the respective server devices 122 and 124. The load balancer devices 118 and server devices 122 (or server devices 124) may also be operatively and/or communicatively coupled to each other via one or more internal networks (not shown) to facilitate communications between the server devices 122 (or server devices 124) and the load balancer devices 118.

To achieve a high degree of availability and responsiveness, and prevent any system, application, and/or component from becoming a single point of failure, the load balancer devices 118 may be generally configured to route or distribute incoming network traffic among multiple server devices 122, guest operating systems 132, and/or container applications 136 and/or native applications 138. The routing and distribution of incoming requests may be determined based on network and transport layer protocols (e.g., port number, IP address, etc.) and/or application layer data (e.g., HTTP header, Uniform Resource Identifier (URI), etc.). Additionally or alternatively, the routing and distribution of incoming requests may be further determined based on the availability, computational load, and/or network load of the server devices. Additionally or alternatively, the routing and distribution of incoming requests may also be determined based on responsiveness of the one or more applications 136 and 138.

For example, the load balancer devices 118 may be configured to route and distribute an incoming HTTP request received from a consumer device (e.g., consumer device 108-1, 108-2, 108-3, etc.) via network 150 to an appropriate server device (e.g., server device 122-1) that hosts a container application or a native application configured to process and/or respond to the incoming HTTP/HTTPS request. The appropriate server device may be determined by the load balancer devices 118 based on the HTTP header of the HTTP request and associated Uniform Resource Identifier. Additionally, the appropriate server device may be further determined by the load balancer devices 118 based on the availability, computational load, and/or network load of the server devices that hosts the container applications 136 and/or the native applications 138 configured to process and/or respond to the incoming HTTP request.

It may be appreciated that while load balancer devices 118 are illustrated as separate devices in FIG. 1, at least a portion of the functionality of the load balancer devices 118 may be performed by a load balancer application (not shown). For example, instead of the one or more load balancer devices 118 performing the functionalities discussed above, a load balancer application (e.g., AMAZON Elastic Load Balancer, GOOGLE Cloud Load Balancer, etc.), which may be implemented as one or more container applications 136 and/or native applications 138 deployed and executed by the one or more server devices 122 and/or 124. In some embodiments, the load balancer application may be configured to implement some or even all the functionalities of the load balancer devices 118. Thus, in some embodiments, the load balancer application may be configured to receive incoming network traffic and route or distribute incoming network traffic among multiple server devices 122, guest operating systems 132, and/or container applications 136 and/or native applications 138.

In an embodiment, each of the server devices (e.g., server device 122-1) of an infrastructure services provider system 116-1 may generally include, without limitation, a virtual machine monitor (VMM) (e.g., VMM 128), which may be configured to execute directly on the server devices and manage the concurrent execution of one or more guest operating systems 132. For example, VMM 128 may be representative of a native or bare-metal hypervisor (e.g., VMWARE ESXi hypervisor, MICROSOFT Hyper-V hypervisor, KVM hypervisor, Proxmox hypervisor, etc.) configured to execute and manage multiple instances of guest operating systems 132 (e.g., MICROSOFT Windows Server, Ubuntu Server, Debian Linux, CentOS Linux, Red Hat Linux, Ubuntu Snappy, CoreOS, VMWARE Photon, etc.) on the server device 122-1.

In an embodiment, the server devices (e.g., server device 124-1) of infrastructure services provider system 116-2 may generally include, without limitation, a host operating system (e.g., host operating system 126-1), which may be further configured to execute a VMM (e.g., VMM 130). The VMM 130 may be a non-native hypervisor which may be configured to execute on a host operating system and manage the concurrent execution of one or more guest operating systems 132. For example, the host operating system 126 may be representative of a server based operating system (Ubuntu Server, MICROSOFT Windows Server, etc.) and the VMM 130 may be representative of a non-native hypervisor (e.g., VMWARE Work Station, VirtualBox, CANONICAL LXD Container Hypervisor, etc.) configured to execute on the host operating system 126 and manage multiple instances of guest operating systems 132 (e.g., Windows Server, Ubuntu Server, Debian Linux, CentOS Linux, Red Hat Linux, Ubuntu Snappy, CoreOS Container Linux, VMware Photon, etc.) on the server device 124-1.

In an embodiment, the one or more guest operating systems 132 may be generally configured to execute one or more container engines 134 (e.g., Docker Container Engine, rkt Container Engine, etc.) and one or more native applications 138. In an embodiment, each of the one or more container engines 134 may be configured to host and manage the execution of one or more container applications 136 within one or more container instances, where each container instance (not shown) may execute a container application in its own isolated runtime environment. In an embodiment, each container instance may include, without limitation, a container operating system (OS), one or more container applications, and associated container components (e.g., executable binaries, support libraries, etc.) to support the execution of the one or more container applications. In an embodiment, each container instance may be created and hosted by the container engine 134 based on a container application image, which may include, without limitation, the container OS image, the container application(s), and associated container components. Thus, the container applications 136 may be hosted and managed by the one or more container engines 134 and defined by its associated container application images. In an embodiment, each container engine of the one or more container engines 134 may also be configured to host and manage the execution of one or more container applications created and deployed by the AADDOMA 162.

In embodiments where the one or more container applications 136 are implemented using a microservices architecture, each container instance may be generally configured to host a microservice of a container application and its associated dependencies. In these embodiments, each container instance may also be configured to host its associated microservice in an isolated runtime environment, where each microservice may be operatively and communicatively coupled to each other to collectively provide services of a particular container application.

In an embodiment, the native applications 138 may include one or more applications that share a common execution environment with a container engine and other native applications 138 in a guest operating system. In an embodiment, the native applications 138 may also include one or more support applications that manage the deployment and execution of the one or more container applications 136 in a container engine of a guest operating system. In an embodiment, the native applications 138 may also include one or more native applications created and/or deployed by the AADDOMA 162.

In an embodiment, container applications 136 and/or native applications 138 may interact with one or more existing services separate from the application during execution. Each service may publish an endpoint accessible by the application, for example in the form of an API. To create and deploy an application as discussed above, the application creation configuration information used by AADDOMA 162 may include API configuration information for each service that contains information required to connect to and invoke the service as further discussed with respect FIG. 6.

Figure 2:
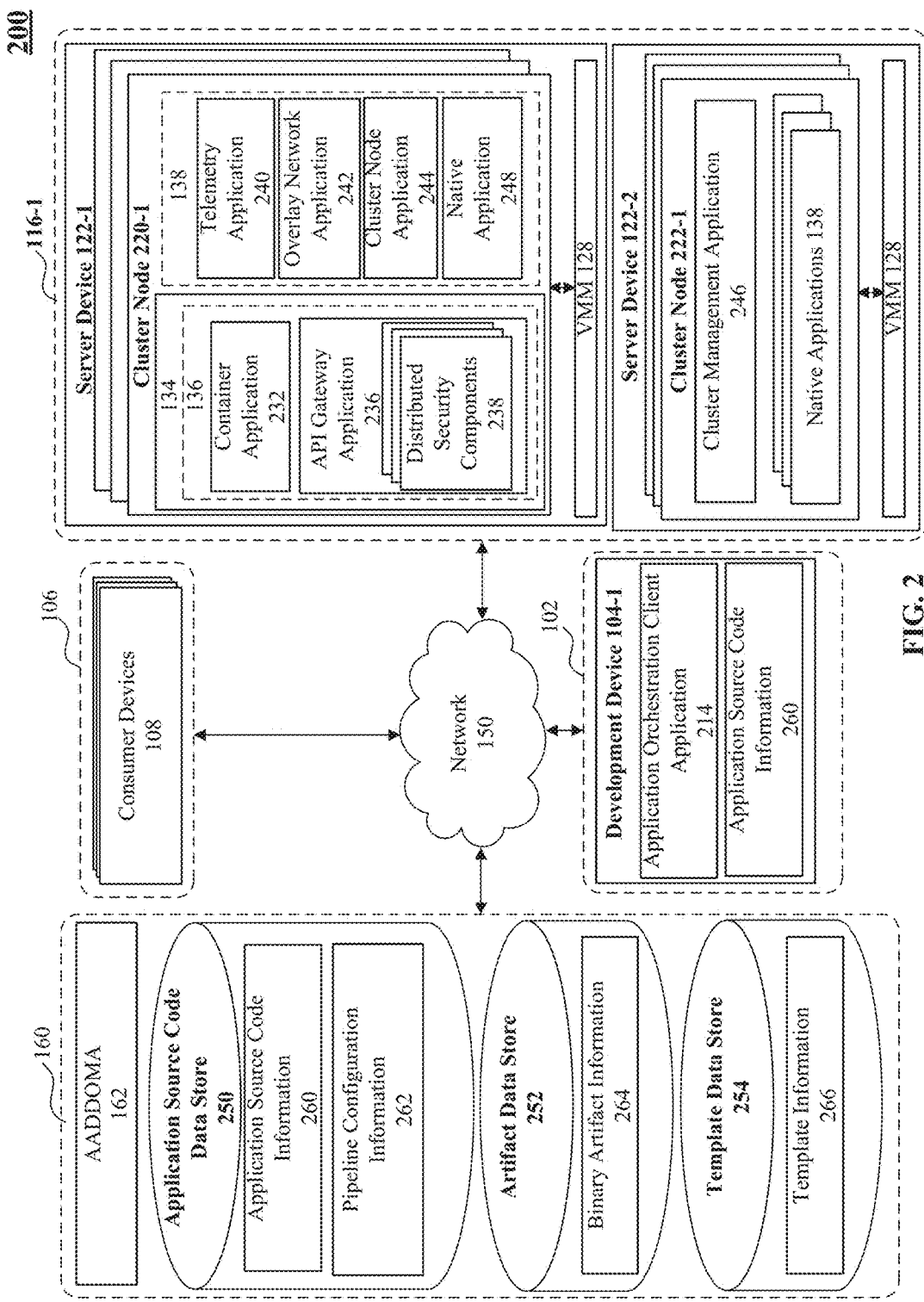
FIG. 2 illustrates another block diagram of the AADDOMS in an example embodiment.

FIG. 2 illustrates another block diagram of the AADDOMA 162 configured to create, build, test, and deploy one or more applications in an example embodiment 200. For example, to create an application with a customizable development, testing, and deployment pipeline, the development device 104-1 may include an application orchestration client application 214 and application source code information 260 may generally include source code for the application and application build configuration for the application.

In an embodiment, the application orchestration client application 214 may be configured to authenticate the application developer based on user authentication information (e.g., login name and password, access token, etc.) provided by the application developer. Once authenticated, the application orchestration client application 214 may employ the AADDOMA 162 to retrieve available developer information representative of common configuration preferences and defaults associated with the application developer identified by their authentication information. Alternatively, the application orchestration client application 214 may be representative of a terminal emulator (e.g., PuTTY, etc.), a Secure Shell client (e.g., OpenSSH, etc.), or a web browser (e.g., GOOGLE Chrome, etc.) configured to connect to AADDOMA 162 via one or more secure protocols (e.g., Secure Shell (SSH) protocol, Hyper Text Transfer Protocol Secure (HTTPS), etc.).

In an embodiment, based on the available developer information retrieved by AADDOMA 162, the application orchestration client application 214 may be configured to present the application developer with one or more questions via a CLI and/or a GUI. In an embodiment, the questions may elicit responses for at least a portion of the application creation configuration information. In an embodiment, the remaining portion of the application creation configuration information may be automatically generated either based on the responses, based on available developer information, or a combination of both. In an embodiment, the application creation configuration information may generally include information that the AADDOMA 162 may use to create, build, test, and deploy an application to an infrastructure services provider system (e.g., infrastructure services provider system 116-1). Additionally, the questions presented to the application developer may be appropriately ordered and may omit any available developer information previously queried.

In an embodiment, the appropriate order of questions to present to an application developer for the creation of an application may include the following order: (1) a name, version, and/or description associated with the application, (2) a location of a data store for storing and/or accessing the application's source code and associated application source code access information (e.g., an API access token, login name and password, etc.) for accessing the data store, (3) one or more programming language(s) associated with the application (e.g., Java, JavaScript, C#, C++, Python, PHP, Ruby, Go, Perl, and Erlang, Node.js, Elixir, etc.) (4) one or more data store(s) associated with the application (e.g., MySQL, MongoDB, InfluxDB, etc.), (5) one or more application source code generation automation options, (6) one or more application build configuration options, and (7) one or more application deployment locations.

In an embodiment, the application creation configuration information may include, without limitation, the location of an application source code data store configured to store application source code information, application source code access information for accessing private application source code data stores, a deployment location of the application, a name of the application, a brief description of the application, creator's name for the application, the creator's credentials (e.g., creator's email address, creator's full name, creator's phone number, creator's organization title, etc.) associated with the application, version information for the application, an organization associated with the application, the software architecture information of the application, the development stack information associated with the application, at least one application template name that identifies a code template used to generate the initial source code for the application, or any combination of thereof.

In an embodiment, the location of the application code data store may identify either a public or a private application code data store in a source code hosting facility (e.g., Github, Gitlab, etc.). Additionally, in embodiments with private application source code data stores, AADDOMA 162 may be configured to access the private application source code data store with application developer provided application source code access information (e.g., an API access token, login name and password, etc.). Alternatively, in embodiments where the application developer did not identify a location of an application source code data store for the application, the AADDOMA 162 may be configured to create a private application source code data store 250 for the application within the cloud platform system 160.

In an embodiment, the development stack information associated with the application may generally identify the operating system, the runtime environment, the dependences, and/or the programming language used and relied upon by the application to be created by the AADDOMA 162. For example, the development stack may identify a Linux operating system, with an Apache web server, a MySQL database, and JavaScript with node.js as the runtime environment.

In an embodiment, the application source code data store 250 may be generally configured to store the source code for an application (i.e., application source code information 260). In an embodiment, the application source code data store 250 may be further configured to store one or more workflows configured to continuously integrate, test, and/or deploy the application, which may be represented as pipeline configuration information 262.

In an embodiment, the pipeline configuration information 262 may include, without limitation, integration workflow information that defines an integration workflow and testing workflow information that defines a testing workflow. In an embodiment, the pipeline configuration information may also define the one or more workflows in a domain-specific language (DSL) in order to provide application developers with maximum flexibility and simplicity when customizing the integration and testing workflows. In an embodiment, the pipeline configuration information 262 may further include, without limitation, infrastructure creation information that defines an infrastructure creation workflow and deployment configuration information that defines a deployment workflow.

In an embodiment, the cloud platform system 160 may further include an artifact data store 252 (e.g., SONATYPE Nexus, JFROG Artifactory, etc.) configured to store binary artifacts represented as binary artifact information 264. In an embodiment, the binary artifacts information may be generated and stored in the artifact data store 252, when the application is built based on the pipeline configuration information 262. In an embodiment, the binary artifact information may include, without limitation, a native application package and/or container application image of the built application.

In an embodiment and based at least partially on the available developer information and/or application creation configuration information, the AADDOMA 162 may be generally configured to perform the initial creation and deployment of an application. To perform the initial creation and deployment of an application, the AADDOMA 162 may be generally configured to: (1) provision an application source code data store (e.g., application source code data store 250) configured to store application source code information (e.g., application source code information 260); (2) generate application source code information based on an identified application template stored in a template data store (e.g., template information 266 stored in template data store 254); (3) store the generated application source code information (e.g., application source code information 260) in the provisioned application source code data store (e.g., application source code data store 250); (4) validate the location of the artifact data store (e.g., artifact data store 252) configured to store binary artifact information (e.g., binary artifact information 264); (5) create and configure an integration workflow and testing workflow for the application; (6) build the application source code information to create an initial set of binary artifacts for testing and deployment; (7) store the initial set of binary artifacts for the application in the artifact data store; (8) test the initial set of binary artifacts and generate test results; (9) optionally provision an application infrastructure (e.g., a cluster including cluster node 220-1 and cluster node 222-1, etc.) within the designated infrastructure services provider system (e.g., infrastructure services provider system 116-1); and/or (10) deploy the application (e.g., custom container application 232, custom native application 248) to an existing or newly created application infrastructure in the designated infrastructure services provider system (infrastructure services provider system 116-1).

In an embodiment, instead of the AADDOMA 162 being configured to generate application source code information as discussed immediately above in (3), the application orchestration client application 214 may be configured to locally generate the application source code information (e.g., application source code information 260 of development device 104-1) based on an identified application template stored in a template data store (e.g., template information 266 stored in template data store 254). Continuing with the above embodiment, after locally generating application source code information, the application orchestration client application 214 may be configured to upload or transmit the generated application source code information (e.g., application source code information 260) to the application source code data store (e.g., application source code data store 250), where the AADDOMA 162 may be configured to: (4) validate the location of the artifact data store; (5) create workflows for the application; (6) build the application source code information; (7) store the initial set of binary artifacts for the application; (8) test the initial set of binary artifacts and generate test results; (9) optionally provision an application infrastructure; and/or (10) deploy the application (e.g., custom container application 232, custom native application 248, etc.) to an existing or newly created application infrastructure as discussed above with respect to AADDOMA 162.

In an embodiment, the AADDOMA 162 may also be configured to roll back or reverse any changes made during the initial application creation process when a failure condition is detected. In an embodiment, a failure condition may include, without limitation, a failure to create an asset during the build and deployment of the application. In an embodiment, the asset may include any resource or package of files generated during the build and deployment of the application, which may include scripts, files, file archives, packages, binaries, container images, test applications, and/or the like. In such embodiments, the AADDOMA 162 may be generally configured to remove the generated build artifacts and roll back or reverse any modifications made during the initial creation and deployment of an application.

In an embodiment, the AADDOMA 162 may also be configured to provide application creation status information to the application developer via the application orchestration client application 214. In an embodiment, the various components of the AADDOMA 162 may generate events and provide progress information indicating the creation and deployment progress of the one or more stages performed by the AADDOMA 162 to create and deploy an application. The progress information may include, without limitation, the stage information indicating the current stage of the application creation and deployment, the time stamp information associated with the status information, and the status information indicating whether the current status is "in progress," "delayed," "waiting," "complete," "failed," or "unknown." In an embodiment, the progress information may be provided in a CLI or visually presented in a GUI (e.g., a progress bar, etc.) in real-time to the application developers via the application orchestration client application 214.

In an embodiment, after the initial application has been created and deployed to an infrastructure services provider system, the application developer may update the application by making changes to the source code of the application (i.e., the application source code information 260) on their development device 104-1. These changes may then be transmitted and stored in the application source code data store (e.g., application source code data store 250). In order to continuously integrate and test these changes and deploy an updated application that incorporate these tested changes, the AADDOMA 162 may be further configured to automatically: (1) detect changes or updates in the application source code data store (e.g., application source code data store 250) indicating an update to the application source code information; (2) build the application source code information to create a set of binary artifacts representative of at least a portion of the updated application for testing and deployment; (3) test at least a portion of the updated application based on one or more configured tests; (4) store the binary artifacts in the artifact data store; (5) detect changes in the artifact data store or receive an event to start the deployment of at least a portion of the updated application; and/or (6) deploy at least a portion of the updated application.

In an embodiment, AADDOMA 162 during the initial creation and deployment of an application may be configured to provision an application infrastructure to host the deployed application. To provision the application infrastructure, the AADDOMA 162 may be configured to create a cluster that includes two or more cluster nodes such as cluster nodes 220-1 and 222-1 on one or more server devices such as server devices 122-1 and 122-2, respectively. In an embodiment, the created cluster may include at least one master cluster node such as cluster node 222-1 that includes a guest OS (e.g., guest OS 132) configured to execute one or more applications that manage one or more slave cluster nodes. In an embodiment, the created cluster may also include at least one slave cluster node such as cluster node 220-1 that includes a guest OS (e.g., guest OS 132) configured to execute one or more applications that communicate with a master cluster node and manages the execution of one or more container applications (e.g., container applications 136, etc.) and/or native applications (e.g., native applications 138, etc.) of the slave cluster node. It may be appreciated that the number of cluster nodes and the topology of the cluster nodes may vary based on the application creation configuration information determined based on answers to questions from the application developer.

In an embodiment, the created cluster may include at least one cluster node 222-1 as a master cluster node. In this embodiment, the cluster node 222-1 may be generally configured to manage one or more slave cluster nodes such as cluster node 220-1 in a cluster. To achieve these and other functionalities, the guest OS (e.g., guest OS 132) of a master cluster node such as cluster node 222-1 may be generally configured to execute, among other native applications 138, cluster management application 246. In an embodiment, the cluster management application 246 may be generally configured to enable the management of the cluster by the AADDOMA 162 via one or more APIs, monitor the availability and status of one or more slave cluster nodes, manage the scheduling of execution of one or more container applications 136, and/or native applications 138 on the one or more slave cluster nodes, and scale the execution of the one or more applications on the one or more slave cluster nodes.

In an embodiment, the created cluster may also include at least one cluster node 220-1 as a slave cluster node. In this embodiment, the cluster node 220-1 may be generally configured to communicate with a master cluster node such as cluster node 222-1 and manage the execution of one or more container applications 136, and/or native applications 138 of the slave cluster node in a cluster node. To achieve these and other functionalities, the guest OS (e.g., guest OS 132) of a slave cluster node such as cluster node 220-1 may be generally configured to execute, among other native applications, a cluster node application 244 configured to maintain communication with the cluster management application 246 and provide status information to the cluster management application 246. To manage the execution of one or more applications (e.g., container applications 136 and/or native applications 138, etc.) on the cluster node 220-1, the cluster node application 244 may be configured to initiate, monitor, and maintain the execution of one or more applications (e.g., container applications 136 and/or native applications 138, etc.) in accordance with management and scheduling as determined by the cluster management application 246 of the master cluster node, i.e., cluster node 222-1.

In an embodiment and during the initial creation of a cluster for an application, the AADDOMA 162 may be generally configured to deploy a telemetry application 240, an overlay network application 242, and a cluster node application 244 to the one or more cluster nodes (e.g., slave cluster nodes). In an embodiment, the telemetry application 240 may be generally configured to monitor health of the one or more container applications 136, native applications 138 and/or associated infrastructure by collecting metrics (e.g., application CPU usage, application memory usage, application network utilization, request queue depth, request response time, etc.) and logs (e.g., error logs, API access logs, etc.) associated with and/or generated by the one or more container applications 136 and/or native applications 138. In an embodiment, the overlay network application 242 may be generally configured to provide an overlay network (e.g., flannel, Weave Net, etc.) to facilitate secure communications between and among one or more applications (e.g., custom container application 232, custom native application 248, container applications 136, and/or native applications 138, etc.) in a cluster.

In an embodiment and during the initial creation of a cluster for an application, the AADDOMA 162 may be generally configured to deploy the newly created container application 232 and optionally, an API gateway application 236 to a slave cluster node (e.g., cluster node 220-1). In an embodiment, the optional API gateway application 236 may be generally configured to provide one or more public and/or private APIs that may be handled by the newly created container application 232. In an embodiment, the optional API gateway application 236 may also include distributed security components 238 that may be configured to provide authentication, authorization, access control, and/or accounting services to the one or more APIs managed by the API gateway application 236.

In embodiments where the one or more applications is implemented using a microservices architecture, the individual microservices may be distributed to one or more cluster nodes (e.g., one or more slave cluster nodes such as cluster nodes 220-1 . . . 220-n). Additionally, the microservices may utilize the overlay network application 242 and the API gateway application 236 in one or more cluster nodes to collectively provide the services of an application.

Figure 3:
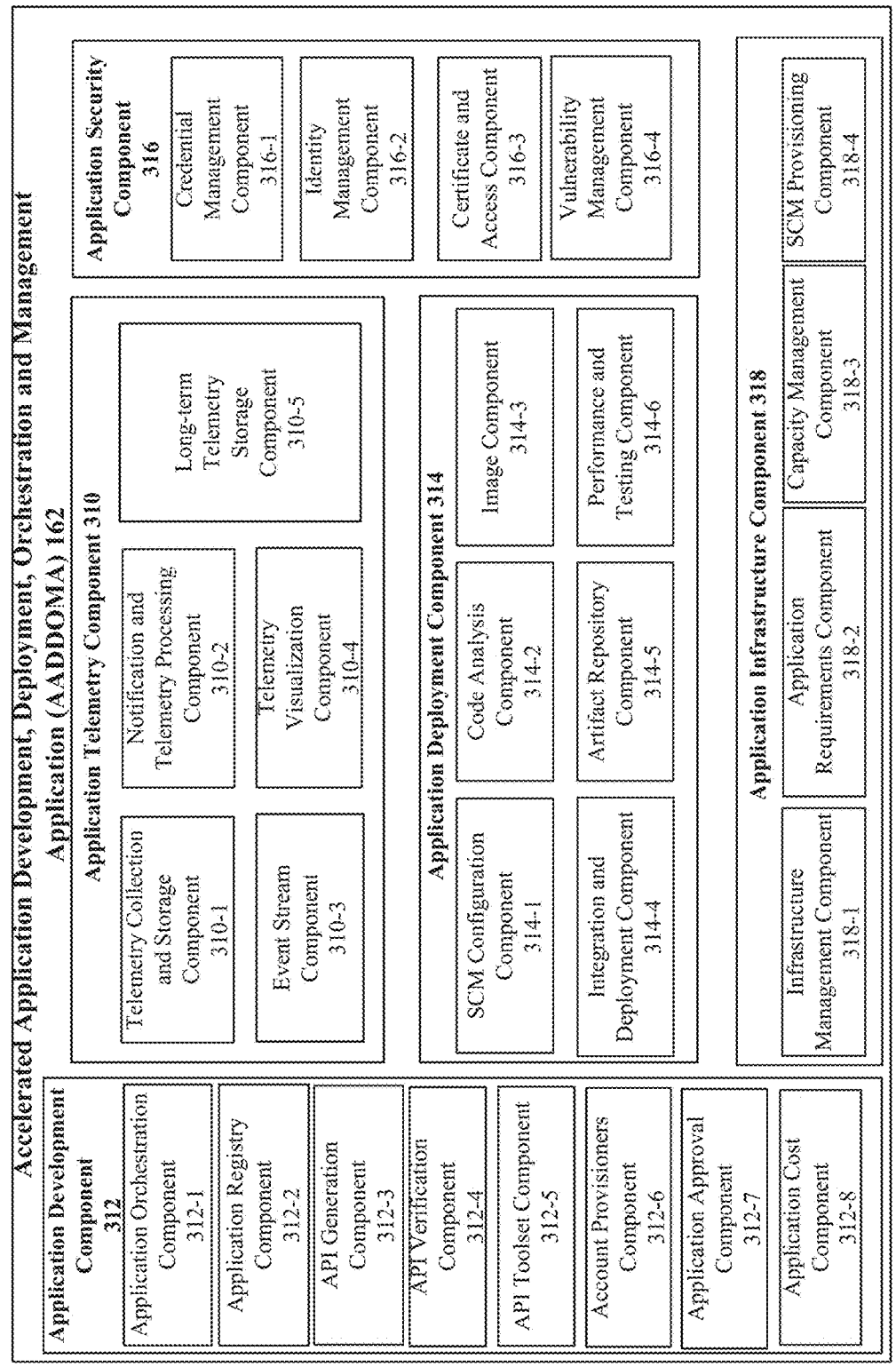
FIG. 3 illustrates a block diagram of the various components of the Accelerated Application Development, Deployment, Orchestration, and Management Application (AADDOMA) according to an example embodiment.

FIG. 3 illustrates a block diagram of the various components of the accelerated application development, deployment, orchestration, and management application according to an example embodiment 300. In FIG. 3, AADDOMA 162 may include, without limitation, application development component 312, application telemetry component 310, application deployment component 314, application security component 316, and application infrastructure component 318.

In an embodiment, the application development component 312 may generally include, without limitation, application orchestration component 312-1, application registry component 312-2, API generation component 312-3, API verification component 312-4, API toolset component 312-5, account provisioners component 312-6, application approval component 312-7, and application cost component 312-8. These components may be operatively and/or communicatively coupled to each other and generally configured to: (1) create, orchestrate, and manage applications and associated components (e.g., data stores, cluster nodes, APIs, etc.) based on application creation configuration information received from application developers; (2) determine application requirements information and application cost information; and/or (3) provide notifications to organizations for applications approval and/or changes prior to deployment of the application.

In an embodiment, the application orchestration component 312-1 may be generally configured to facilitate the creation of a variety of different types of applications (e.g., custom container application 232, custom native application 248, etc.) based on application creation configuration information. In an embodiment, the application orchestration component 312-1 may be generally configured to determine the application creation configuration information by providing one or more questions to an application developer and receiving one or more responses from the application developer via application orchestration client application 214. Once the application creation configuration information is determined, the application orchestration component 312-1 may be further configured to perform the initial creation and deployment of the application as previously discussed with respect to FIG. 2.

In an embodiment, the application orchestration component 312-1 may also be generally configured to generate application requirements information based on the application creation configuration information. The application requirements information may include a set of values that define how the application will be created, built, tested, deployed, and/or managed. In an embodiment, the list of requirements may also be implemented in a domain-specific language (DSL).

In an embodiment, the application orchestration component 312-1 may be further configured to generate application source code information (e.g., application source code information 260) and pipeline configuration information (e.g., pipeline configuration information 262) based on the application creation configuration information. The application source code information may generally include, without limitation, the source code of the application to be created and application build configuration of the application to be created (e.g., makefiles, etc.).

In an embodiment, the pipeline configuration information may also include, without limitation, integration workflow and testing workflow configured to facilitate continuous integration of the application to be created and the frequent, recurring, automated, and configurable testing of the created application. The pipeline configuration information may further include an infrastructure creation workflow configured to facilitate the creation of a new cluster (if needed) and a deployment workflow configured to facilitate deployment of the created and tested application to the newly created cluster or an existing cluster as designated by the application developer.

In an embodiment, the application orchestration component 312-1 may also be generally configured to provide the generated application requirements information to the application requirements component 318-2 to determine the application resource information which may include, without limitation, the number of cluster nodes required for an application, and the number of container instances to be hosted by the cluster nodes for the application. The application orchestration component 312-1 may also be generally configured to provide the application resource information and application creation configuration information to the application cost component 312-8 to determine application cost information. The application cost information may generally include an itemized Total Cost of Ownership (TCO) estimate associated with creating, deploying, and/or managing the application.

In an embodiment, the itemized TCO estimate may include, without limitation, one or more costs associated with: (1) hosting and managing the application developer's application within an infrastructure services provider system, (2) underlying operational activities associated with the hosted application (e.g., network traffic, other resources billed by bandwidth or storage volume, etc.) in the infrastructure services provider system, (3) third party applications and/or components integrated with the application developer's application, (4) additional and optional third party application integrated with the application developer's application, (5) development, testing, and maintenance of the AADDOMA 162, and/or (6) additional levels of technical support in creating, building, testing deploying, and/or managing the application developer's application.

In an embodiment, the application registry component 312-2 may be generally configured to manage and visually present a data store of indices of an application developer's applications and associated components (e.g., data stores, common AADDOMA 162 applications and components, etc.). In an embodiment, the application registry component 312-2 may be updated when an application developer creates a new container application or new native application. In an embodiment, the application registry component 312-2 may be generally configured to store links or references to information for one or more applications and associated components. The information may include, without limitation, location of endpoints of an application and/or associated components for retrieval of telemetry information, mappings for retrieval of configuration information, deployment versions and identifier of the application and/or associated components, endpoints of the application and/or component to facilitate interaction with other applications and/or components.

In an embodiment and with continued reference to the application registry component 312-2, the indexed or referenced applications may be visually presented in one or more views (e.g., one or more GUI views visually presented in a web browser). In an embodiment, the one or more views may include, without limitation, a customizable application developer view and a cloud platform view. In an embodiment, the one or more views may be generally arranged to visually present the different applications, associated components of applications, and relationships between the applications and associated components as one or more graphical elements (e.g., nodes and links, etc.) that may represent application developer's applications, associated applications and components, data stores, network communications, API endpoints, and/or the like.

In an embodiment and with continued reference to the application registry component 312-2, the application developer view may be generally arranged to visually present the applications, associated components of the applications, and their relationships based on, for example, the organizational hierarchy (e.g., business units, design teams, etc.) of an application developer's organization. In an embodiment, the cloud platform view may be generally arranged to present the application developer view with different applications associated components of the applications, and their relationships based on, for example, the dependencies (e.g., data dependency, etc.) between the applications and associated components.

In an embodiment, the application registry component 312-2 may also be generally configured to enable the addition of descriptive information to the graphical elements that represent an application or an associated component of the application in one or more views. In this embodiment, the descriptive information and its associated application or component may be stored in a data store as key-value pairs. In an embodiment, the one or one or more views may also be visually customized and linked.

In an embodiment, the API generation component 312-3 may be generally configured to generate API specifications information and generate one or more APIs exposed by an API gateway for an application developer's application (e.g., custom container application 232, custom native application 248) in accordance with one or more programming paradigms (e.g., DbC, etc.). In an embodiment, the API generation component 312-3 may be configured to provide an API gateway via an API gateway application (not shown), where the API gateway application may be an existing API gateway application managed by the AADDOMA 162 (not shown) or an application developer's own API gateway application (e.g., API gateway application 236) deployed with the application.

In an embodiment, the API gateway may be generally configured to provide distributed rate limiting, authentication, authorization, access control, and/or accounting to manage and/or monitor access of one or more APIs exposed by the API gateway. In an embodiment, the API gateway may be configured to expose and aggregate multiple generated APIs behind a single Domain Name System (DNS) name. In an embodiment, each generated API may also be operatively connected to one or more endpoints of the application developer's created and deployed application.

In an embodiment, the API verification component 312-4 may be generally configured to create automated API test applications based on the API specifications information for one or more APIs exposed by an API gateway. The API test applications may be configured to validate the one or more APIs in accordance with the API specifications information and one or more programming paradigms (e.g., DbC, etc.). For example, the API test applications may validate the one or more APIs based on specific and agreed upon preconditions, post-conditions for each function of an API and validate all functions of the API based on general rules or invariants that govern the API. Additionally or alternatively, the API gateway hosted by an API gateway application itself may be configured to validate the one or more APIs during runtime in accordance with the API specifications information and one or more programming paradigms (e.g., DbC, etc.).

In an embodiment, the API toolset component 312-5 may be configured to provide one or more APIs for common AADDOMA 162 applications and/or components (e.g., event publisher components, event listener components that interface with the event stream component 310-3, etc.) that may be deployed with the application developer's application (e.g., custom container application 232, custom native application 248). The API toolset component 312-5 may be configured to create, manage, and register one or more services within an API gateway hosted by an API gateway application for the one or more common AADDOMA 162 applications and/or components.

In an embodiment, the account provisioners component 312-6 may be generally configured to manage accounts associated with one or more users (e.g., application developers of an organization, DevOps engineers of an organization, managers of an organization, reviewers of an organization, executives of an organization, etc., etc.) of the AADDOMA 162 for one or more organizations. In an embodiment, the account provisioners component 312-6 may be generally configured to create one or more accounts for the one or more users of the AADDOMA 162 and manage user authentication information associated with each user account. In an embodiment, the account provisioners component 312-6 may also be configured to manage common configuration preferences and defaults for the one or more users such as application developers (e.g., developer information) and/or one or more users within a particular organization.

In an embodiment, the application approval component 312-7 may be generally configured to elicit approval from organizations before the creation and/or deployment of an application and provide organizations with the ability to control the cost of creating, deploying, and/or managing applications in the AADDOMS 100. Additionally or alternatively, the application approval component 312-7 may also be generally configured to elicit approvals from an application developer's organization, when the application creation configuration information used to create an application substantially deviates from presets or defaults of an organization's application creation configuration information.

For example, the application approval component 312-7 may be configured to provide an approval notification (e.g., email notification, notification via an user interface (UI) element, etc.) to a designed user (e.g., manager of an organization, etc.) via a development device (e.g., development device 104-2, 104-3, etc.) to elicit an approval to create and/or deploy an application when a minimum number of cluster nodes required to host the application in an infrastructure services provider system substantially increases from the organization's default number of cluster nodes per application (e.g., greater than fifty (50) percent, seventy (70) percent, etc.). In response to receiving the elicited approval from the development device associated with the designated user, the application approval component 312-7 may be configured to enable the creation and/or deployment of the application.

In an embodiment, the application approval component 312-7 may be configured to provide application approval notifications to the application developer's organization: (1) after determining the application creation configuration information and application cost information but before creating an application; (2) after creating the application but before deployment of the application to the infrastructure services providers; and/or (3) after creating the application but before changing the configuration/scale (e.g., increases or decreases from the organization's default number of cluster nodes per application, etc.) of the application. The application approval notifications may include, without limitation, application cost information. The application cost information may include the costs associated with creating, deploying, and/or managing the application. In an embodiment, the application approval component 312-7 may be configured to enable organizations to provide approvals (or disapprovals) prior to creation of an application and/or deployment of an application in response to a particular application approval notification.

In an embodiment, the application cost component 312-8 may be generally configured to provide the application cost information to one or more components of the AADDOMA 162 (e.g., the application orchestration component 312-1) based on at least a portion of application requirements information generated by the application requirements component 318-2 and/or at least a portion of application creation configuration information for a particular application to be created and deployed. As previously discussed, the application cost information may generally include an itemized TCO estimate associated with creating, deploying, and/or managing the application.

In an embodiment, the application deployment component 314 may generally include, without limitation, source code management (SCM) configuration component 314-1, code analysis component 314-2, image component 314-3, integration and deployment component 314-4, artifact repository component 314-5, and performance and testing component 314-6. These components may be operatively and/or communicatively coupled to each other and generally configured to: (1) provide an integration and testing workflow to continuously integrate, test, and deploy an application; (2) perform code analysis on the application source code and provide code analysis information to the application developers and their organization; and (3) enable the modification of the testing workflow to include test logic gates and provide testing as a service.

In an embodiment, the SCM configuration component 314-1 may be generally configured to enable the creation and/or provisioning of application source code data store (e.g., application source code data store 250) for storing application source code represented as application source code information (e.g., application source code information 260). The SCM configuration component 314-1 may be generally configured to provision an application source code data store in a public or private source code hosting facility (e.g., GitHub, GitLab, etc.) in response to receiving a request from the application orchestration component 312-1 during the initial creation and deployment of an application.

In an embodiment, the code analysis component 314-2 may be generally configured to perform code analysis (e.g., static code analysis using SonarQube, COMPUWARE Topaz, Twistlock, etc.) to analyze the application source code information (e.g., application source code information 260) stored in an application source code data store (e.g., application source code data store 250) in order to identify and report one or more errors in the source code (e.g., duplicate code, syntax errors, logic errors, memory leaks, security vulnerabilities, etc.). In an embodiment, the code analysis component 314-2 may be configured to analyze the application source code information and provide the code analysis information in response to a request to perform code analysis.

In an embodiment, the code analysis component 314-2 may be configured to perform code analysis: (1) immediately before and/or after the application source code information (e.g., application source code information 260) is built and tested; (2) during the application source code information build process and before the application is tested; or (3) after receiving a source code update event that indicates the application source code information has been updated in an application source code data store (e.g., application source code data store 250). Additionally or alternatively, the code analysis component 314-2 may be configured to automatically perform code analysis on a periodic basis (e.g., every hour, every eight (8) hours, every twenty-four (24) hours, etc.). In an embodiment, the code analysis component 314-2 may also be configured to provide the code analysis information to one or more application developers after performing a code analysis.

In an embodiment, the image component 314-3 may be generally configured to generate one or more container images that support the operation of a container application. The one or more container images may include, without limitation, one or more container OS images that are used to create a container instance hosted by a container engine (e.g., container engine 134) of a cluster node (e.g., cluster node 220-1 as a slave cluster node). The container OS images may generally include, without limitation, an image of an OS with customized configurations and a minimum amount OS services to support the execution of container applications and associated container components within a container instance.

In an embodiment, the integration and deployment component 314-4 may be an automation server configured to execute one or more customizable integration workflows and/or customizable testing workflows configured to automate the process of at least building and testing applications and facilitate the deployment of one or more applications in accordance to a deployment workflow. In an embodiment and during the initial creation of an application, the integration and deployment component 314-4 may be configured to create pipeline configuration information (e.g., pipeline configuration information 262) which may include, without limitation, integration workflow information that defines an integration workflow for the application and testing workflow information that defines a testing workflow for the application.

In an embodiment and with continued reference to the integration and deployment component 314-4, the created integration workflow may be configured to: (1) retrieve the application source code information (e.g., application source code information 260) from an application source code data store (e.g., application source code data store 250); (2) build or compile the retrieved application source code information; and (3) provide the output of the build process, i.e., binary artifacts information (e.g., binary artifact information 264) to the artifact repository component 314-5 for storage in an artifact data store (e.g., artifact data store 252), where the stored binary artifacts information may include, without limitation, the application built from the application source code information (e.g., application source code information 260); (4) test the built application with one or more testing applications in accordance with the testing workflow; and (5) generate testing result information that includes one or more test results from the execution of one or more test applications.

In an embodiment and after creating the pipeline configuration information, the integration and deployment component 314-4 may be configured to: (1) store the created pipeline configuration information (e.g., pipeline configuration information 262) in an application source code data store (e.g., application source code data store 250 that also stores the application source code information 260); (2) perform the one or more workflows of the pipeline configuration information to build and test the application; and (3) provide a deployment ready notification or generate a deployment ready event indicating that the application has successfully completed and passed testing workflow and the artifact data store 252 includes the application stored in a container application image for execution on container engines (e.g., container engines 134) or a native application package for installation and execution directly on a Guest OS (e.g., Guest OS 132) rather than on a container engine.

To enable at least continuous integration and testing, the integration and deployment component 314-4 may be further configured to: (1) detect changes or updates in the application source code data store (e.g., application source code data store 250) that indicate an update to the application source code information for an application; (2) retrieve the pipeline configuration information associated with the application source code information from the application source code data store; (3) perform the building and testing of the application in accordance with the retrieved pipeline configuration information; and (4) generate testing report information that includes one or more test results. Additionally or alternatively, the integration and deployment component 314-4 may be configured to automatically perform integration and testing on a periodic basis (e.g., every eight (8) hours, every twenty four (24) hours, etc.).

In an embodiment, the integration and deployment component 314-4 may also be configured to detect one or more binary repository update events during the execution or interpretation of the integration workflows and testing workflows. In response to the detection of binary repository update events, the integration and deployment component 314-4 may verify the set of generated build artifacts including an application for testing and initiate the execution or interpretation of the testing workflow to test the application.

In an embodiment, the integration and deployment component 314-4 may also be configured to generate a deployment ready event indicating that a container application image or native application package that includes the built and tested application has passed its associated testing workflow and is ready for deployment to an infrastructure services provider for use by clients, consumers, or customers of the application developer, which may be subsequently deployed by the infrastructure management component 318-1 to a provisioned or an existing cluster and accessible by consumer devices 108 via network 150.

In an embodiment and to determine the outcome of the deployment of an application, the integration and deployment component 314-4 may be generally configured to detect one or more deployment success events indicating the successful deployment of one or more applications to one or more designated clusters in an infrastructure services provider system. Additionally, the integration and deployment component 314-4 may also be configured to detect one or more deployment failure events indicating the failed deployment of one or more applications to one or more designated cluster in an infrastructure services provider system.

In an embodiment, the artifact repository component 314-5 may be generally configured to manage an artifact data store (e.g., artifact data store 252) and facilitate the storage of build artifacts represented as binary artifact information (e.g., binary artifact information 264) generated and used during integration and testing. In an embodiment and as previously discussed, the binary artifact information may include, without limitation, the native application package and/or container application image of the built application. In an embodiment, the artifact repository component 314-5 may also be configured to generate binary repository update events to report changes or updates to the binary repository.

In an embodiment, the performance and testing component 314-6 may be generally configured to modify the testing workflow information, manage one or more testing applications, and/or generate one or more test applications. In an embodiment, the one or more testing applications may be generally configured to perform testing of applications and components including one or more components of the AADDOMA 162 using various testing paradigms (e.g., black-box testing, grey-box testing, white-box testing, etc.) on individual components of an application (unit testing), multiple components of application (integration testing), and/or the entire application (system testing) with a variety of testing processes such as functional testing.

In an embodiment, the performance and testing component 314-6 may be configured to generate a test application based on API specifications information generated by the API generation component 312-3 for an application. In an embodiment, the generated test application may be configured to provide randomized input to the application to be tested via its APIs and monitor the responses for compliance with the API specifications information.

In an embodiment, the performance and testing component 314-6 may be configured to provide testing as a service by: (1) deploying the container application image or a package that includes the application to be tested to a development environment configured to simulate a production environment; (2) execute the generated test application to provide randomized input that simulates peak access patterns the application may experience via its APIs when the application is executing in a production environment; (3) monitor the responses of the container application to determine compliance with the API specifications information for the application; and (4) generate testing result information based on the determined compliance with the API specifications information for the application. In an embodiment, development environment may include, without limitation, one or more cluster nodes that are primarily used for testing the application and not used by the customers or clients of an application developer that created the application (e.g., users of one or more consumer devices 108). In an embodiment, the production environment may include, without limitation, one or more cluster nodes that are primarily used by the customers or clients of the application developer that created the application (e.g., users of one or more consumer devices 108).

In an embodiment, the performance and testing component 314-6 may be configured to modify a testing workflow of pipeline configuration information associated with an application to include, without limitation, testing as a service configured to deploy an application to a development environment for testing with input data and access patterns that simulate a production environment. Additionally or alternatively, the performance and testing component 314-6 may be further configured to enable the modification of the testing workflow of the pipeline configuration information associated with an application to include one or more test logic gates. The one or more test logic gates inserted into a testing workflow may be generally configured to control the progression through the testing workflow by the integration and deployment component 314-4 based on the test results of one or more test applications.

For example, the performance and testing component 314-6 may be configured to enable the insertion and configuration of a test logic gate in a testing workflow at the end of completion of one or more tests of the built application and prior to the deployment of the tested application to a cluster in an infrastructure services provider system. The inserted test logic gate may be configured to notify a designated user (e.g., DevOps Engineer, etc.) to provide manual approval at the end of the testing workflow before completion of the testing workflow and subsequent deployment of the application. Thus, upon the execution or interpretation of the test logic gate by the integration and deployment component 314-4 within a testing workflow, the integration and deployment component 314-4 may be configured to provide a test gate notification to a designated user (e.g., DevOps Engineer, etc.) of an organization associated with the application developer via a development device (e.g., development device 104-2, 104-3, etc.) to elicit approval to proceed beyond the test logic gate. In response to receiving the elicited approval from the development device associated with the designated user, the integration and deployment component 314-4 may execute or interpret additional tasks beyond the test logic gate as defined in the testing workflow such as deployment of the tested application to a cluster in an infrastructure services provider system.

In an embodiment, the application infrastructure component 318 may generally include: an infrastructure management component 318-1, application requirements component 318-2, capacity management component 318-3, and SCM provisioning component 318-4. These components may be operatively and/or communicatively coupled to each other and generally configured to: (1) create an application infrastructure for hosting one or more applications and deploy the one or more applications to the created application infrastructure; (2) estimate infrastructure needs based on created application infrastructure and automatically increase account limits; and (3) determine and provide the number of cluster nodes that will be required and the number of container instances that will be hosted by the cluster nodes for the application.

In an embodiment, the infrastructure management component 318-1 may be generally configured to execute or otherwise interpret infrastructure creation workflow information to create an application infrastructure for an application to be created within a designated infrastructure services provider system. As previously discussed, infrastructure creation information may define an infrastructure creation workflow. The infrastructure creation workflow may be configured to create, without limitation, a cluster that includes at least one slave cluster node and at least one master cluster node to execute the applications. The at least one master cluster node may be configured to execute a cluster management application (e.g., cluster management application 246) to manage at least one slave cluster node up to a maximum number of cluster nodes. Each slave cluster node may be configured to execute a cluster node application (e.g., cluster node application 244) to manage the execution of one or more container applications 136 and/or native applications 138 within their respective slave cluster node. The cluster node application of each slave cluster node may be configured to initiate, monitor, and maintain the execution of one or more applications on the respective slave cluster node. Additionally, the cluster node application of each slave cluster node may be configured to communicate with a master cluster node to provide high availability and scalability of one or more applications hosted on a slave cluster node.

In an embodiment, the infrastructure management component 318-1 may also be generally configured to execute or otherwise interpret deployment configuration information. As previously discussed, deployment configuration information may define a deployment workflow configured to deploy one or more applications to a cluster. Additionally, the deployment workflow may be transmitted to the newly created cluster or an existing cluster and executed or otherwise interpreted by the cluster node application and/or cluster management application including other container applications and/or native applications (e.g., package managers such as DEIS Helm, etc.) to deploy one or more applications to the slave cluster nodes. For example, the deployment workflow may be configured to deploy to one or more slave cluster nodes a telemetry application configured to collect metrics and logs generated by or associated with one or more applications, an overlay network application 242 configured to provide an overlay network to facilitate secure communications between and among one or more applications.

In an embodiment, the infrastructure management component 318-1 may be configured to: (1) receive a deployment ready notification; (2) detect a deployment ready event; or (3) detect changes or updates in the artifact data store 252, all indicating that the application has successfully completed and passed testing workflow and the artifact data store 252 includes the application stored in a container application image. In an embodiment, upon: (1) receiving the deployment ready notification; (2) detecting the deployment ready event; or (3) detecting changes or updates in the artifact data store 252, the infrastructure management component 318-1 may be configured to provide the deployment configuration information to the cluster and communicate with the cluster master node to deploy the container application image or a native application package stored in the artifact data store 252 to one or more slave cluster nodes for execution by their respective container engines or guest OSes in accordance with the deployment workflow defined in the deployment configuration information.

In an embodiment and after the deployment of the container application image or native application package by the infrastructure management component 318-1 has successfully completed, the infrastructure management component 318-1 may also be configured to generate a deployment success event indicating that the application has been successfully deployed to a designed cluster in an infrastructure services provider system. Additionally, the infrastructure management component 318-1 may also be configured to generate a deployment failure event indicating that the application has failed to be deployed to a designed cluster in an infrastructure services provider system.

In an embodiment, the infrastructure management component 318-1 may also configure one or more master cluster nodes with automatic horizontal scaling capable of scaling up the number of slave cluster nodes up to a maximum number and/or scaling down the number of slave cluster nodes to a minimum number. In such embodiments, the master cluster node may be configured to scale up the number of cluster nodes by automatically deploying additional container application images and/or native application packages to additional slave cluster nodes up to a maximum number of slave cluster nodes for the cluster, upon determining that one or more metrics of existing slave cluster nodes have exceeded a specific threshold limit (e.g., CPU utilization of all existing slave cluster nodes have exceed fifty (50) percent, seventy (70) percent, etc.).

Additionally or alternatively, the master cluster node may also be configured to scale down to a minimum number of cluster nodes by, for example, stopping the execution of container instances on slave cluster nodes in the cluster, upon determining that one or more metrics of existing slave cluster nodes have fallen below a specific threshold limit (e.g., CPU utilization of all existing slave cluster nodes have fallen below fifty (50) percent, seventy (70) percent, etc.) for a specific period of time (e.g., one hour, two hours, etc.). In such embodiments, the master cluster node may be further configured to scale down by stopping the execution of container application instances and/or native applications of only slave cluster nodes in the cluster that have been idle (e.g., zero (0) percent CPU utilization and/or no active or pending API requests or responses) for a specific period of time (e.g., one hour, two hours, etc.).

In an embodiment, the application requirements component 318-2 may be generally configured to: (1) receive application requirements information generated and provided by the application orchestration component 312-1; (2) generate application resource information based on the application requirements information; and (3) provide the generated application resource information. As previously discussed, the application resource information may include, without limitation, the number of cluster nodes required for an application, and the number of container instances to be hosted by the cluster nodes for the application.

In an embodiment, the capacity management component 318-3 may be generally configured to predict or estimate the amount of computing resources (e.g., number of server devices and/or guest OSes, etc.) of an infrastructure services provider that are to be purchased and allocated for use for all application developers and organizations. In an embodiment, the capacity management component 318-3 may be configured to predict the amount of computing resources required for a future time period based on the utilization of computing resources by all applications in a past time period. In an embodiment, the capacity management component 318-3 may also be configured to automatically increase the account limits or purchase additional computing resources from an infrastructure services provider based on predicted utilization for a future time period.

In an embodiment, SCM provisioning component 318-4 may be generally configured to host or create a private source code hosting facility (not shown) in the cloud platform system 160 generally configured to manage a private application source code data store (e.g., application source code data store 250). In an embodiment and as previously discussed, the SCM configuration component 314-1 may be configured to request the created private source code hosting facility to provision an application source code data store 250 for storing the application source code information 260 and associated pipeline configuration information 262.

In an embodiment, the application security component 316 may include, without limitation, credential management component 316-1, identity management component 316-2, certificate and access component 316-3, and vulnerability management component 316-4. These components may be generally configured to provide authorization, authentication, access control, and/or accounting. These components may be operatively and/or communicatively coupled to each other and generally configured to: (1) provide management of user credentials; (2) provide authentication, authorization, and access control to one or more APIs; and (3) determine and provide notifications of vulnerabilities and misconfigurations.

In an embodiment, the credential management component 316-1 may be generally configured to store, distribute, and manage credentials (e.g., user name and password, API access keys, etc.) of users of AADDOMA 162 (e.g., application developers of an organization, DevOps engineers of an organization, managers of an organization, executives of an organization, etc.). In an embodiment, the credential management component 316-1 may also be generally configured to enable credential auditing (e.g., remove inactive users, modify users from groups, etc.) on a periodic basis and enforce one or more expiration and rotation policies of credentials.

In an embodiment, identity management component 316-2 may be generally configured to provide authentication, authorization, and access control of users that access the one or more APIs of the AADDOMA 162. To provide authentication, authorization, and access control, the identity management component 316-2 may be configured to issue access tokens that provide access to one or more APIs of the AADDOMA 162 and/or one or more APIs of an application developer's application in accordance with one or more authorization standards (e.g., OAuth, etc.).

In an embodiment, the certificate and access component 316-3 may be generally configured to generate, provide, and/or manage digital certificates distributed to various components of the AADDOMA 162. The distributed digital certificates may be utilized by the various components to secure access between and among one or more components of the AADDOMA 162.

In an embodiment, the vulnerability management component 316-4 may be generally configured to scan for vulnerabilities and misconfigurations (e.g., malware, deprecated applications and components, etc.) in various applications components of the cloud platform system 160 and in one or more applications and associated components deployed in an infrastructure services provider system. Additionally or alternatively, the vulnerability management component 316-4 may be configured to continuously scan for vulnerabilities and misconfigurations in one or more components, in one or more data stores (e.g., application source code data store 250, artifact data store 252, template data store 254, etc.), and one or more applications in the infrastructure services provider systems. In an embodiment, the vulnerability management component 316-4 may also be configured to generate and provide the vulnerabilities assessment information to analysts, administrators, support staff, and developers of the cloud platform system 160.

In an embodiment, the application telemetry component 310 may generally include, without limitation, telemetry collection and storage component 310-1, notification and telemetry processing component 310-2, event stream component 310-3, telemetry visualization component 310-4, and long-term telemetry storage component 310-5. These components may be operatively and/or communicatively coupled to each other and generally configured to: (1) collect and store telemetry information from various components and applications; (2) provide visualization of collected telemetry information (3) analyze collected telemetry information and provide notifications when one or more breaching conditions occurs and the occurrence of one or more breaching conditions requires a notification; (4) and facilitate the communication of events to and from various components of the AADDOMA 162.

In an embodiment, the telemetry collection and storage component 310-1 may be generally configured to monitor health of various components of AADDOMA 162, cluster nodes, and applications. To monitor the health, the telemetry collection and storage component 310-1 may be configured to receive telemetry information from telemetry application 240 one or more cluster nodes and various components of the AADDOMA 162 and store the received telemetry information in a short-term telemetry data store (not shown). In an embodiment, the telemetry information may include one or more metrics (e.g., CPU utilization, disk I/O, network I/O, memory usage) and one or more logs (e.g., API access log, authentication log, etc.). In an embodiment, each metric may be represented as a time series of data points for a particular resource (e.g., an application, guest OS, container instance, server device, etc.). In an embodiment, each log may be represented as a time series of occurrences of one or more events (e.g., request, responses, actions, etc.).

In an embodiment, the telemetry collection and storage component 310-1 may be configured to enforce data retention and/or lifecycle policies by removing stored telemetry information after a set time period. Additionally or alternatively, the telemetry collection and storage component 310-1 may also be configured to transfer the stored telemetry information in the short-term telemetry data store to a long-term telemetry data store (not shown) managed by the long-term telemetry storage component 310-5.

In an embodiment, the event stream component 310-3 may be generally configured to manage a global event stream that facilitates component communications by receiving events (e.g., source code update event, deployment ready event, deployment success event, deployment failure event, logging events that include logs and metrics, etc.) published by one or more event publishers indicating the occurrence of one or more changes and/or mutations to one or more components and/or associated data stores of the AADDOMA 162. Additionally, the event stream component 310-3 may also be generally configured to publish the received events to one or more event listeners of the AADDOMA 162. In an embodiment, the one or more event publishers and event listeners may include, without limitation, one or more applications deployed in one or more cluster nodes and various components of the AADDOMA 162. In an embodiment, the event stream component 310-3 may also be configured to store the received events as global event stream information in an event stream data store (not shown). In an embodiment, the stored global event stream information may be organized as a time series of occurrences of the one or more events so that it may be correlated with the stored telemetry information.

In an embodiment, the notification and telemetry processing component 310-2 may be generally configured to process the telemetry information and global event stream information and determine the occurrence of one or more breach conditions whether one or more metrics, logs, and/or events includes data points or entries that meets and/or exceeds a threshold value defined for a particular metric, log, and/or event within a particular time frame. Additionally or alternatively, the notification and telemetry processing component 310-2 may also be configured to perform predictive and trend based analytics by utilizing one or more machine learning algorithms (e.g., regression algorithms, decision tree algorithms, Bayesian algorithms, etc.). The telemetry information and/or global event stream information may be utilized by the notification and telemetry processing component 310-2 to train the one or more machine learning algorithms in order to predict an occurrence of one or more breach conditions before they occur. Based on the occurrence and/or predicted occurrence of one or more breaching conditions, the notification and telemetry processing component 310-2 may be further configured to provide an alarm notification to various users of the AADDOMA 162 as well as analysts, administrators, support staff, and developers of the AADDOMA 162.

In an embodiment, the telemetry visualization component 310-4 may be generally configured to provide, in one or more GUIs, visualizations of collected telemetry information for debugging, performance monitoring, and performance optimizations. Additionally or alternatively, the telemetry visualization component 310-4 may be configured to correlate collected telemetry information with stored global event stream information and visually present the combination in one or more GUIs. In an embodiment, the telemetry visualization component 310-4 may provide the collected telemetry information in one or more GUIs to various users of the AADDOMA 162 as well as analysts, administrators, support staff, and developers of the AADDOMA 162.

In an embodiment, the long-term telemetry storage component 310-5 may be generally configured to provide a cost-effective long-term telemetry data store to store telemetry information. In an embodiment, the long-term telemetry storage component 310-5 may be configured to store the telemetry information in compliance with standards and policies set forth by the application developer's organization, and the application developer's clients, customers, or consumers, and/or industry.

Figure 4:
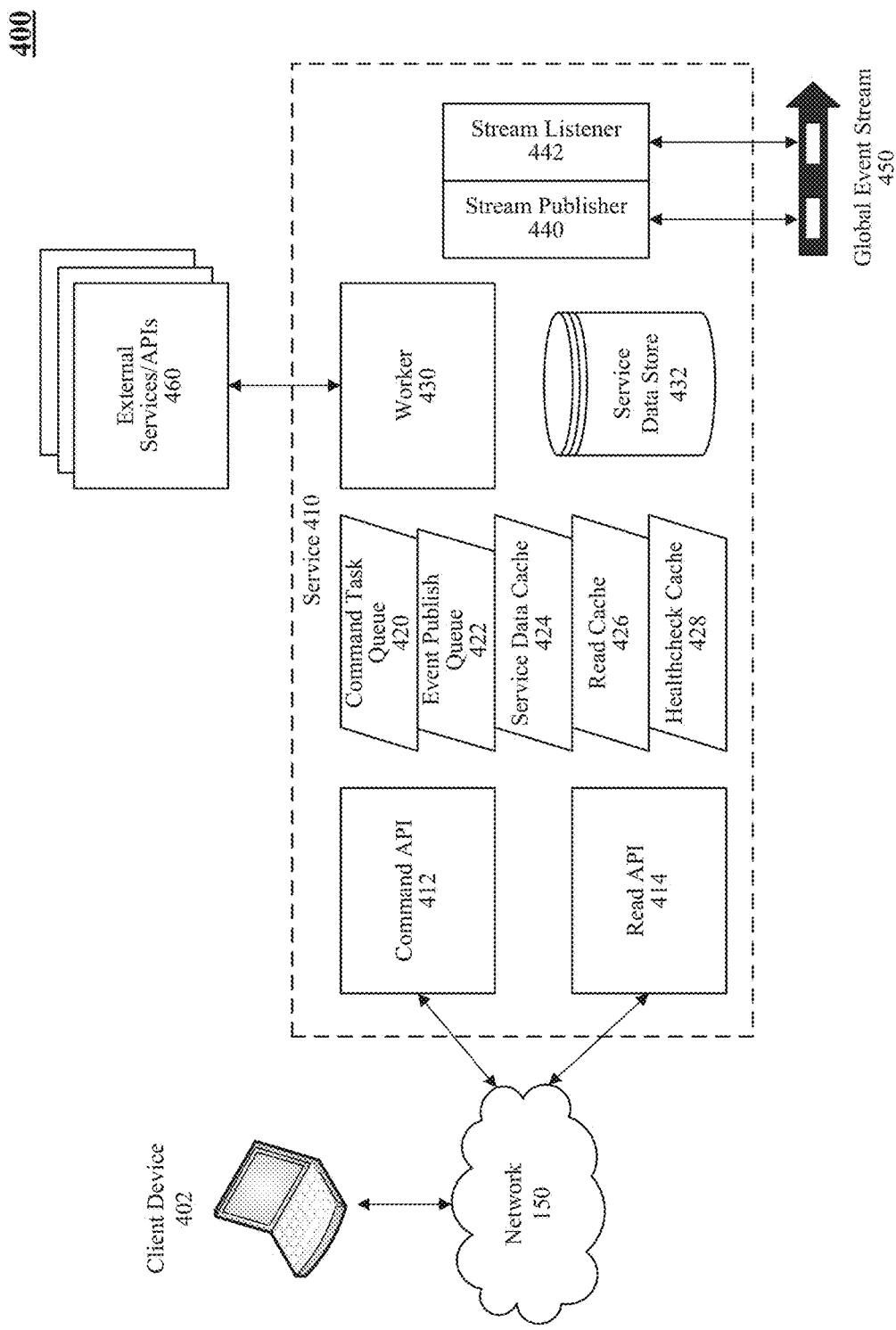
FIG. 4 illustrates a block diagram of the various components of a deployed service, according to an embodiment.

FIG. 4 illustrates a block diagram of the various components of a deployed service, according to an embodiment. A service in this context may refer to any software service, microservice, application, or component residing within cloud platform system 160 or infrastructure services provider systems 116, as described with respect to FIG. 1, that may be configured to respond to requests. For example, a service may refer to a component of AADDOMA 162, such as application telemetry component 310 or application security component 316 of FIG. 3. A service may also refer to a service or component provided by a software application deployed to infrastructure services provider system 116-1.

FIG. 4 illustrates a client device 402 coupled to a service 410 via network 150. In an embodiment, network 150 may be representative of one or more computer and/or telecommunications networks that may enable coupled and/or interconnected systems and/or devices to communicate information between and among each other, as described in FIG. 1. In various embodiments, client device 402 may represent a development device 104, consumer device 108, or internal component of AADDOMA 162 that is configured to make requests to service 410. In an embodiment, a request may conform to any request-response network protocol capable of relaying the request information, such as an HTTP or HTTPS request. The request may also be encoded in a known encoding format, such as XML, JSON or SOAP.

In an embodiment, service 410 may include command API 412, read API 414, command task queue 420, event publish queue 422, service data cache 424, read cache 426, healthcheck cache 428, worker 430, service data store 432, stream publisher 440, and stream listener 442. Each component of service 410 may execute as its own process or as a thread as part of service 410. Alternatively, command task queue 420, event publish queue 422, service data cache 424, read cache 426, and healthcheck cache 428 may execute within a single process, or may be divided into a queuing process and a caching process. In an embodiment, the components of service 410 may execute as part of one or more container instances running within a container engine, such as container engine 134 as discussed with respect to FIG. 1. For example, each component of service 410 may execute as its own container application, such as container application 136 of FIG. 1, or as processes/threads of one or more container applications. The components may be divided logically among container instances, for example based on the container OS included as part of the container instance.

Read API 414 may receive read requests from client device 402, for example and without limitation, GET, HEAD, OPTIONS, and CONNECT requests, and return appropriate data to the requester. Further details of read API 414 are discussed with respect to FIG. 6. Command API 412 may receive command requests related to actions to be performed, such as and without limitation, POST, PUT, PATCH, and DELETE requests. Command requests may specify different operations besides read operations, for example to create or modify specified data, but a command request may also read data too. In an embodiment, Command API 412 may process requests asynchronously. That is, instead of maintaining an open connection between client device 402 and command API 412 for the duration of the request, the connection may be closed shortly after client device 402 transmits the request. In such a case, according to an embodiment, a request identifier may be generated upon receiving the request and transmitted to client device 402. Client device 402 may then poll read API 414 to retrieve a status of the request. In an embodiment, command API 412 and read API 414 may execute as separate processes or threads as part of service 410. This separation of read and command request processing may enable service 410 to load balance service tasks, as well as implement separate object models that may be better suited for read and command tasks, respectively.

In an embodiment, when a request is received by command API 412, command API 412 may determine a task to be performed by service 410 based on the request. Command API 412 may then place a message on command task queue 420 specifying the task to be performed. Command task queue 420 may act as a queue of tasks for worker 430, which may actually execute the task. In an embodiment, command task queue 420 may deliver the message to worker 430 upon receipt of the message. Additionally or alternatively, worker 430 may detect a message when it is received by command task queue 420, for example by periodically polling command task queue 420 or receiving a notification from command task queue 420. According to an embodiment, worker 430 may represent one or more processes or threads executing as part of service 410 designed to execute a service task.

In an embodiment, worker 430 may interact with multiple data sources to perform a service task. Worker 430 may retrieve data from service data cache 424, service data store 432, one or more components of AADDOMA 162 (e.g., application orchestration component 312-1 or telemetry visualization component 310-4 of FIG. 3), and/or external services/APIs 460 that contain data or other sub-operations required to perform the task (e.g., a service providing public reference data needed by worker 430). For example, worker 430 may retrieve visualization data related to a deployed software application from telemetry visualization component 310-4 and, in turn, provide the retrieved data to client device 402. An external service 460 may be provided by a third party and coupled to service 410 via a network, such as network 150. When data is retrieved from an external service 460 and/or one or more components of AADDOMA 162, the data or a portion of the data may be stored in service data cache 424. Service data cache 424 may be a worker-facing cache and may store external data for use in performing future tasks in an effort to reduce communication outside of service 410 to, for example, external services/APIs 460. Worker 430 may query and retrieve data from service data cache 424 before requesting data from an external services/APIs 460. According to an embodiment, service data cache 424 may periodically interact with external services/APIs 460 directly to update data stored in service data cache 424 for later use by worker 430.

In an embodiment, service data store 432 may store data provided by and used by service 410. Service data store 432 may be any type of structured or unstructured data store, such as but not limited to a relational, document-oriented, time-oriented, or object-oriented database. Service data store 432 may also represent multiple data stores to provide load balancing and/or replication. In an embodiment, data store 432 may execute as its own process or set of processes to manage durability, availability, and performance of the data stores.

Event publish queue 422 may temporarily hold messages destined for global event stream 450, as discussed further below. Command task queue 420 and event publish queue 422 may implement any type of queuing method, such as but not limited to first-in-first-out (FIFO), last-in-first-out (LIFO), priority queuing, or fair queuing. Read cache 426 may act as a high performance data persistence layer used to shield service data store 432 from heavy read requests by storing commonly or recently used data. In this manner, worker 430 may first attempt to retrieve data needed to perform a task from read cache 426 before querying service data store 432. Read API may also attempt to retrieve data from read cache 426 in response to a read request before querying service data store 432 for the requested data, as discussed with respect to FIG. 6. In an embodiment, read cache 426 may implement a least recently used (LRU) caching scheme to replace data within read cache 426, but one of skill in the art will appreciate that other caching schemes may be used depending on the needs of a service provider. Read cache 426 may store data for use by both worker 430 and read API 414 (and in turn client device 402), as discussed above.

Healthcheck cache 428 may store data related to the overall health and the health of each component of service 410. Each component may periodically report health data to healthcheck cache 428, and read API 414 may enable access the health data in healthcheck cache 428, for example by client device 402. In an embodiment, health data may be stored in any type of data structure useable for storing data, for example, a hash map that maps each service component to its related health data. In an embodiment, service 410 may also include a cache manager (not shown) that may manage and reduce the risk of unexpected failure of command task queue 420, event publish queue 422, service data cache 424, read cache 426, and healthcheck cache 428. The cache manager may periodically run various testing procedures to ensure the health of each of these service components. In an embodiment, the cache manager may also store test result data in healthcheck cache 428.

In an embodiment, if the cache manager detects an issue or failure in a service component, the cache manager may transmit a notification to other affected components, such as command API 412, read API 414, worker 430, stream publisher 440, and/or stream listener 442. The notification may indicate the failed service component and may specify a location to reroute requests for the failed component. In an embodiment, the cache manager may also alert a service management component of AADDOMA 162, for example application infrastructure component 318, application telemetry component 310, application deployment component 314, or application security component 316 of FIG. 3, to initiate repair of the failed component.

Service 410 may be coupled to a global event stream 450. In an embodiment, global event stream 450 may be a system-wide event stream that receives messages for deployed services within a system and allows services to subscribe to messages emitted by other services within the system. In this manner, global event stream 450 facilitates communication between related services and applications within the system. In an embodiment, global event stream 450 may be managed by an event stream component, such as event stream component 310-3 of FIG. 3. Stream publisher 440 may retrieve or receive messages from event publish queue 422 and publish the message to global event stream 450. In an embodiment, event publish queue 422 may push messages to stream publisher 440. Additionally or alternatively, stream publisher 440 may periodically poll event publish queue 422 for queued messages. For example, when a service task is completed, worker 430 may place a task completed message on event publish queue 422 for dissemination to related services and applications. Stream publisher 440 may then pick up this message and transmit the message to global event stream 450. In an embodiment, stream publisher 440 may apply transformation rules to the message to ensure the message is properly formatted before transmission to global event stream 450.

Stream listener 442 may subscribe to global event stream 450. When a message is received, stream listener 442 may apply a set of filtering rules to determine whether the message is relevant to service 410. If the message is relevant, stream listener 442 may examine the message to determine whether a task is required to be performed by service 410. For example, a task completion message received from another service may indicate to stream listener 442 that a particular task may now be performed by service 410. Stream listener 442 may then construct a task message defining the task to be performed and transmit the task message to command task queue 420. Worker 430 may then pick up the task message and execute the task, as described above.

In an embodiment, each of components 412-442 within service 410 may be load balanced for improved performance and scalability. For example, multiple instances of each component may be executed in parallel to handle surges in requests. Additional memory may also be allocated to service data cache 424 and/or read cache 426 when needed. In an embodiment, load balancing functions may be performed by command API 412, read API 414, and/or a separate load balancing component within or coupled to service 410.

Example Methods

Figure 5:
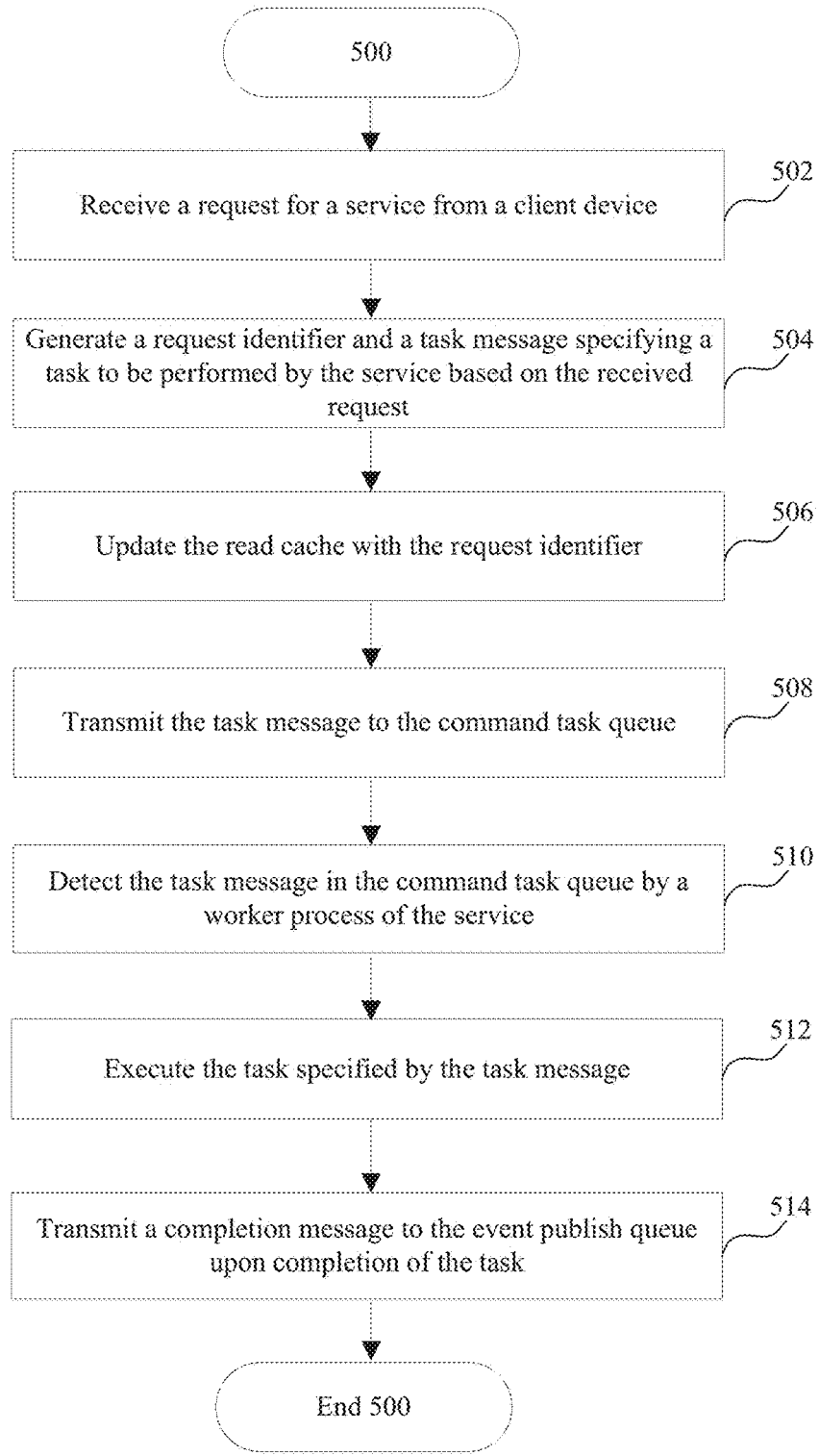
FIG. 5 illustrates an example method for processing a service request, according to an embodiment.

FIG. 5 illustrates an example method 500 for processing a service request, according to an embodiment. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 begins at stage 502 by receiving a request for a service from a client device, such as client device 402 of FIG. 4. In an embodiment, the request may be received by a command API, such as command API 412 of FIG. 4. The request may be a command request, for example and without limitation, a POST, PUT, PATCH, or DELETE request. In some embodiments, the command API may first validate credentials of the client device to determine the scope of actions that may be requested by the client device. For example, a request to modify administrative data may only be requested by an administrator with appropriate security credentials. In an embodiment, the request may be routed from the client device to the command API via an API gateway, such as API gateway application 236 of FIG. 2. In various embodiments and depending on the location of the service, the API gateway may reside within cloud platform system 160 or infrastructure services provider systems 116 of FIG. 1.

At stage 504, a request identifier and a task message specifying a task to be performed by the service may be generated based on the received request. The request identifier may take any logical form, such as but not limited to an alphanumeric string, and the identifier may be unique to the request, for example by generating a unique sequence number or random string. In an embodiment, the request identifier may be generated based on characteristics of the requesting client device, for example by incorporating a hash of the hostname of the client device. The request identifier may also be mapped to the requesting client device and stored by the service. This mapping may be stored, for example and without limitation, in memory as part of the command API, read API, and/or read cache processes executing as part of the service. The mapping may also be stored in a service data store, such as service data store 432 of FIG. 4, according to an embodiment. The task message may be generated based on characteristics of the received request. For example, the request may specify to update a data record stored by the service with a new value. In this case, the task message may include this directive in the form of a task specification. The task specification may take any logical form that is readable by a worker process, such as worker 430 of FIG. 4. For example, the task specification may be, without limitation, plain text describing the task, an identifier mapped to a particular task, an object expressed in a markup language, or coded instructions for the worker to execute.

At stage 506, a read cache, for example as read cache 426 of FIG. 4, may be updated with the request identifier. In an embodiment, the client device may poll a read API for status of the request. The read API may publish an endpoint accessible to the client, for example using a particular uniform resource identifier (URI) such as "{service domain}/status/{request_identifier}." The request identifier may also be passed to the read API as a separate parameter of the request not included in the URI, for example in the body of the request. The read API may then query the read cache for the current status and return the status to the requesting client device. This obviates the need to maintain an open connection while the request is being processed. In an embodiment, the command API may update the read cache with an initial status upon receipt of the request. A worker performing the task specified by the task message may then periodically update the read cache with progress status.

In an embodiment, the command API may also place a message on an event publish queue, such as event publish queue 422 of FIG. 4, when the request is received. This message may indicate, for example, that a request has been received and details of the request that may be relevant to other services and applications connected to a global event stream, such as global event stream 450 of FIG. 4.

At stage 508, the task message may be transmitted to a command task queue, for example command task queue 420 of FIG. 4. Command task queue 420 may act as a queue of tasks for worker 430, which may actually execute the task. At stage 510, the task message may be detected by a worker process of the service, for example worker 430 of FIG. 4. In an embodiment, the detection may be performed by delivering the message to the worker process upon receipt of the message. Additionally or alternatively, worker may detect a message when it is received by the command task queue, for example by periodically polling the command task queue or receiving a notification from the command task queue.

At stage 512, the task specified by the task message may be executed. According to an embodiment, this execution may be performed by the worker process. In an embodiment, the worker process may interact with multiple data sources to perform a service task. In particular, the worker process may retrieve data from a service data cache, such as service data cache 424 of FIG. 4, a service data store, such as service data store 432, one or more components of the AADDOMA 162, and/or an external service, such as external services/APIs 460, that contain data required to perform the task (e.g., a service providing public reference data needed by the worker process). An external service may be provided by a third party and coupled to the service via a network, such as network 150 of FIG. 1. When data is retrieved from an external service and/or one or more components of AADDOMA 162, the data or a portion of the data may be stored in the service data cache, according to an embodiment. The service data cache may be a cache accessible by workers and may store external data for use in performing future tasks in an effort to reduce communication outside of the service. The worker process may query and retrieve data from the service data cache before requesting data from an external service. According to an embodiment, the service data cache may periodically interact with an external service directly to update data stored in the service data cache for later use by the worker process.

Finally, at stage 514, a completion message may be transmitted to the event publish queue upon completion of the task. In an embodiment, the completion message may be received from the read API. This completion message may be picked up by a stream publisher, such as stream publisher 440 of FIG. 4, and published to a global event stream, such as global event stream 450, to notify related services and applications of the task completion. This may be important, for example, if a related service or application relies on completion of a particular task before starting work on another task.

Figure 6:
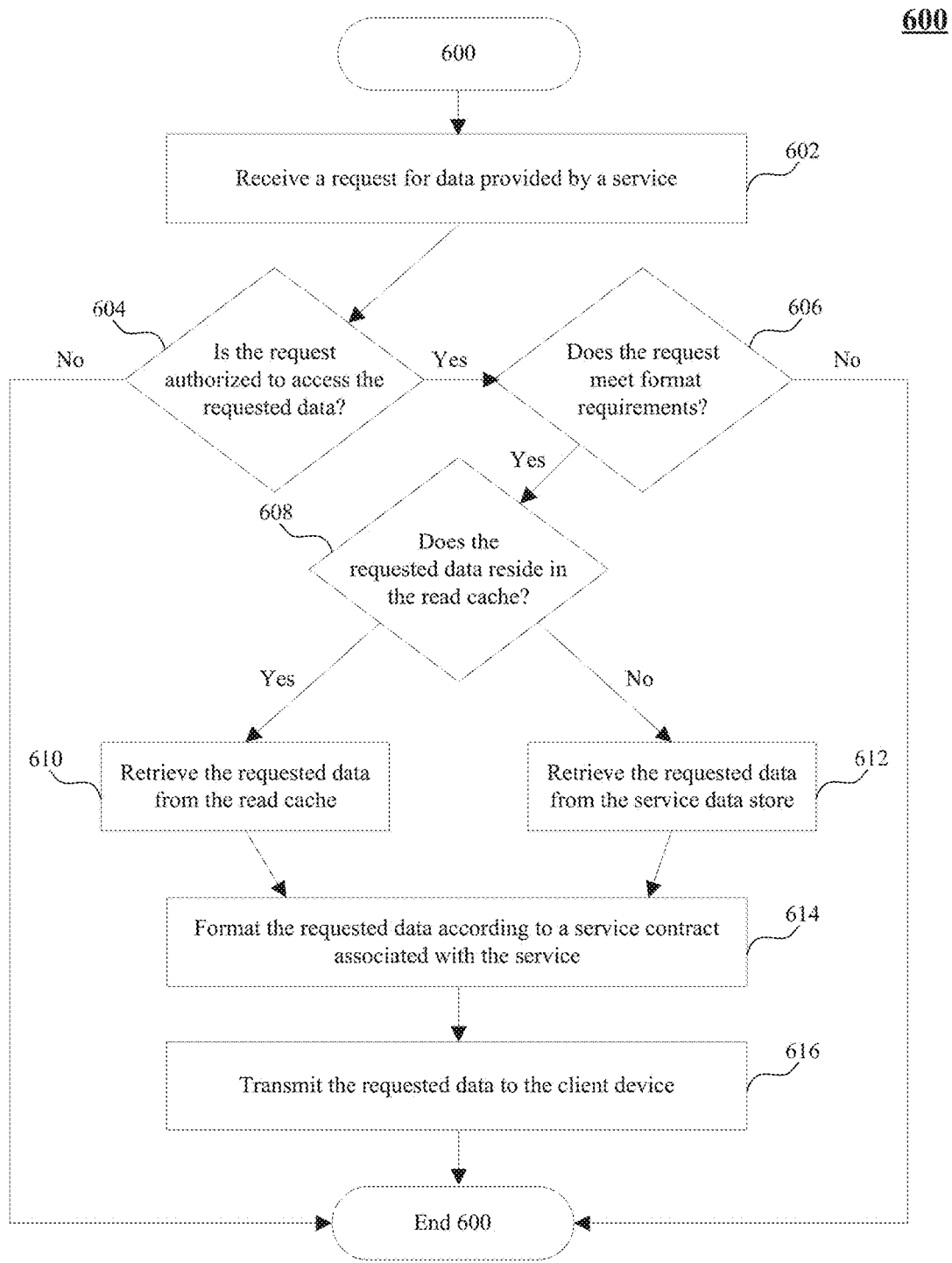
FIG. 6 illustrates an example method for processing a request for data provided by a service, according to an embodiment.

FIG. 6 illustrates an example method 600 for processing a request for data provided by a service, according to an embodiment. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 begins at stage 602 by receiving a request for data provided by a service from a client device, such as client device 402 of FIG. 4. Alternatively, the request may be received from another service. In an embodiment, the request may be received by a read API, such as read API 414 of FIG. 4. In an embodiment, the request may be routed from the client device to the read API via an API gateway, such as API gateway application 236 of FIG. 2. In various embodiments and depending on the location of the service, the API gateway may reside within cloud platform system 160 or infrastructure services provider systems 116 of FIG. 1.

At stage 604, it may be determined whether the request has authorization to access the requested data. In an embodiment, credentials of the requesting client device (or service) may be checked against data access permissions to determine whether the requesting client, and thus the request, is authorized to access the requested data. If the request does not have proper authorization, the request may be denied and the method ends.

At stage 606, it may be determined whether the request meets certain format requirements. In an embodiment, the request may first be examined to determine a format of the request. Format requirements for the service may be retrieved and used to determine whether the format of the request meets these requirements. For example, format requirements may specify certain formats or protocols that the request must comport with, such as and without limitation, XML, JSON, Simple Object Access Protocol (SOAP), and/or particular fields contained within the request. The format requirements may further specify required field values, inputs, or other data as part of the request. In an embodiment, these format requirements may be predefined as part of a service contract for the service. If the requested data is not formatted properly, the request may be denied and the method ends.

At stage 608, it may be determined whether the requested data resides in a read cache, for example read cache 426 of FIG. 4. If the requested data has already been cached, the method proceeds to stage 610 where the requested data may be retrieved from the read cache. If it is determined that the requested data does not reside in the read cache (e.g., a cache miss occurs), the method proceeds to stage 612 where the requested data may be retrieved from a service data store, such as service data store 432 of FIG. 4. In an embodiment, the read API may query the service data store directly for data missing from the read cache. Additionally or alternatively, the read API may transmit an update message to a command task queue, such as command task queue 420 of FIG. 4, which may specify an update task to refresh the read cache with the requested data. This may be useful for more complex data requests that require additional logic or processing before retrieving data from the service data store. A worker process may then detect the update message in the command task queue and execute the update task, as described with respect to method 500 of FIG. 5. In an embodiment, the read API may transmit a task message to the command task queue to retrieve the requested data from the service data store and return the requested data directly to the read API, rather than to the read cache. This may occur when the read cache is unavailable or to avoid an additional request to the read cache to retrieve the requested data. In some embodiments, only a portion of the requested data may have been previously cached. In this case, method 600 may perform both stages 610 and 612, for example to retrieve cached data from the read cache and the remaining data from the service data store.

At stage 614, the requested data may be formatted according to a service contract associated with the service. For example, the requested data may be formatted and packaged as a representational state transfer (RESTful) object, such as a JavaScript object notation (JSON) object or extensible markup language (XML) object, for return to the client device. This ensures that the client device receives the requested data in an expected format specified by the defined service contract. Finally, at stage 616, the formatted requested data may be transmitted to the client device.

Figure 7:
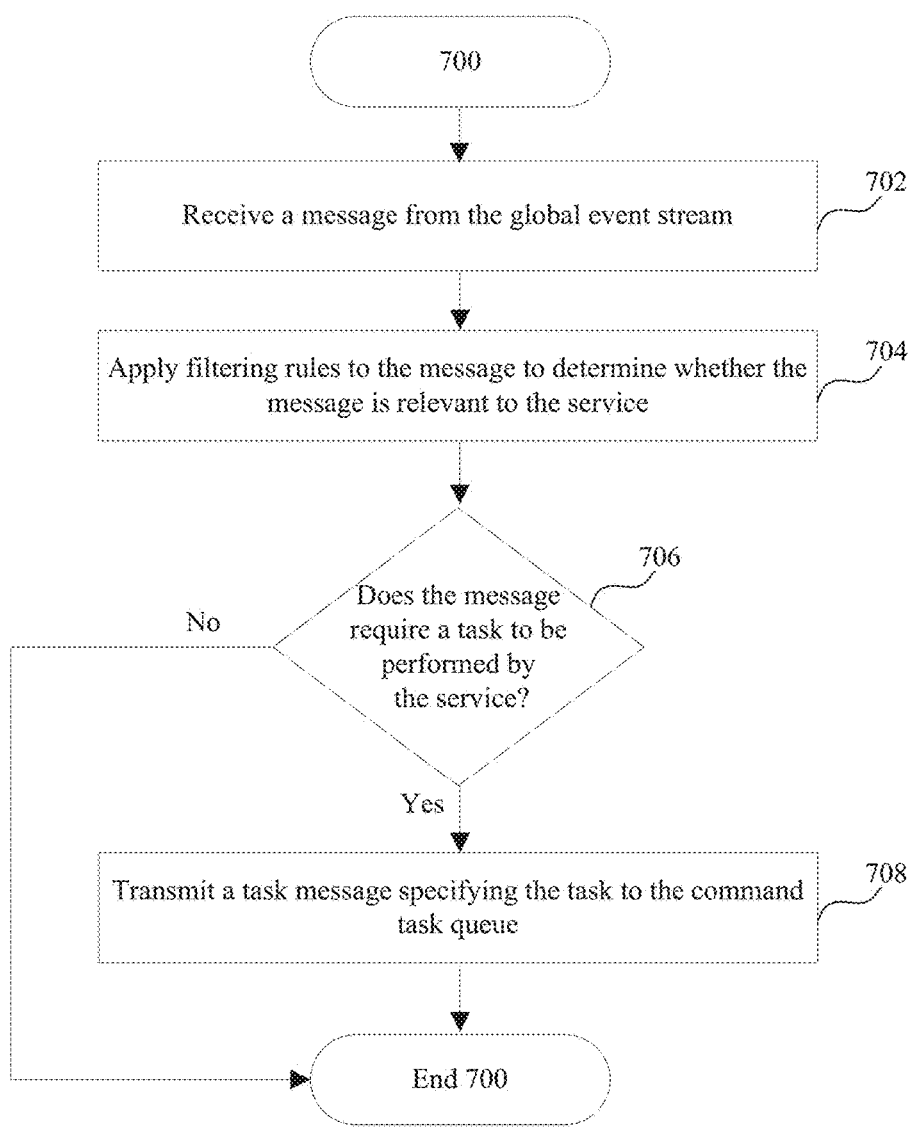
FIG. 7 illustrates an example method for processing a message received from a global event stream, according to an embodiment.

FIG. 7 illustrates an example method 700 for processing a message received from a global event stream, according to an embodiment. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 begins at stage 702 by receiving a message from the global event stream, for example global event stream 450 of FIG. 4. The global event stream may facilitate communication between related services within the control of a larger system. In an embodiment, the message may be received by a stream listener, such as stream listener 442 of FIG. 2. The message may have been emitted from another service or application in response to the occurrence of an event, for example completion of a task or receipt of a new request from an unknown device.

At stage 704, filtering rules may be applied to the message to determine whether the message is relevant to the service. For example, an authentication service may apply a set of filtering rules that ignore messages unrelated to authentication. In an embodiment, filtering rules may filter messages based on, for example and without limitation, a particular event type or message type, a category of message types, the source of the message, a timestamp of the message (e.g., time of transmission or receipt), a message tag, a particular attribute or field contained within the message, or other data contained within the payload of the message. For example, the message payload may include an action to be performed or identifiers of objects being acted upon, which may be used as part of the filtering rules. In an embodiment, an event type may be include a description of an object or component and an action taken upon that object or component, for example, "userCreated," "applicationUpdated," or "repositoryDeleted." These filtering rules may be stored in a data store associated with the service, such as service data store 432 of FIG. 4.

At stage 706, it may be determined whether the message requires a task to be performed by the service. In an embodiment, the stream listener may include predefined logic based on the type of message received to determine whether the message needs to be acted upon by the service. The stream listener may also query a service data cache, such as service data cache 424 of FIG. 4, and/or a service data store, such as service data store 432, for additional contextual information related to the message. This information may be used to determine how to process the received message and determine a task to be performed. If no task is to be performed in response to receiving the message, the method ends. Otherwise, the method proceeds to stage 708.

At stage 708, a task message specifying the task to be performed by the service may be transmitted to the command task queue. In an embodiment, the stream listener may transmit the task message directly to the command task queue. Alternatively, the stream listener may transmit the task message to a command API, such as command API 412 of FIG. 4, which may in turn transmit the task message to the command task queue. The task message may then be detected by a worker process of the service, and the worker process may execute the task, as described in detail with respect to method 500 of FIG. 5. The worker process may place a message in the event publish queue indicating the start of execution of the task. In an embodiment, the service may include a separate stream worker process, separate from worker 430 of FIG. 4, to balance service load. This may be useful for maintaining the requirements of a service level agreement (SLA) for the service.

Figure 8:
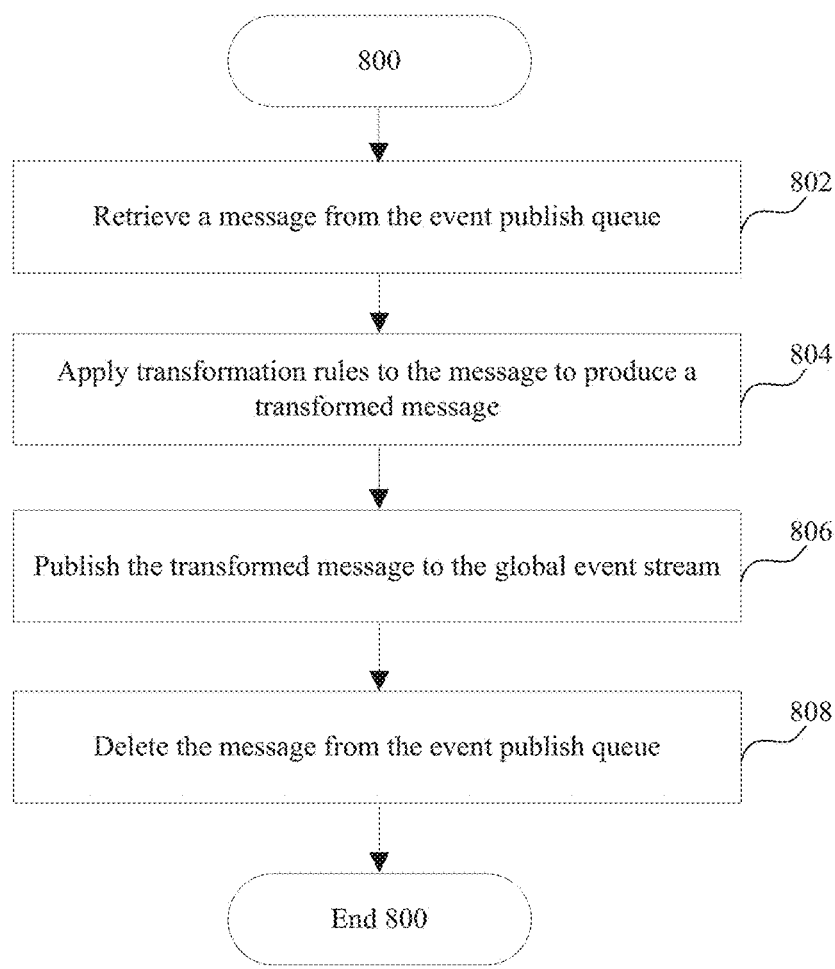
FIG. 8 illustrates an example method for publishing a message to a global event stream, according to an embodiment.
Figure 9:
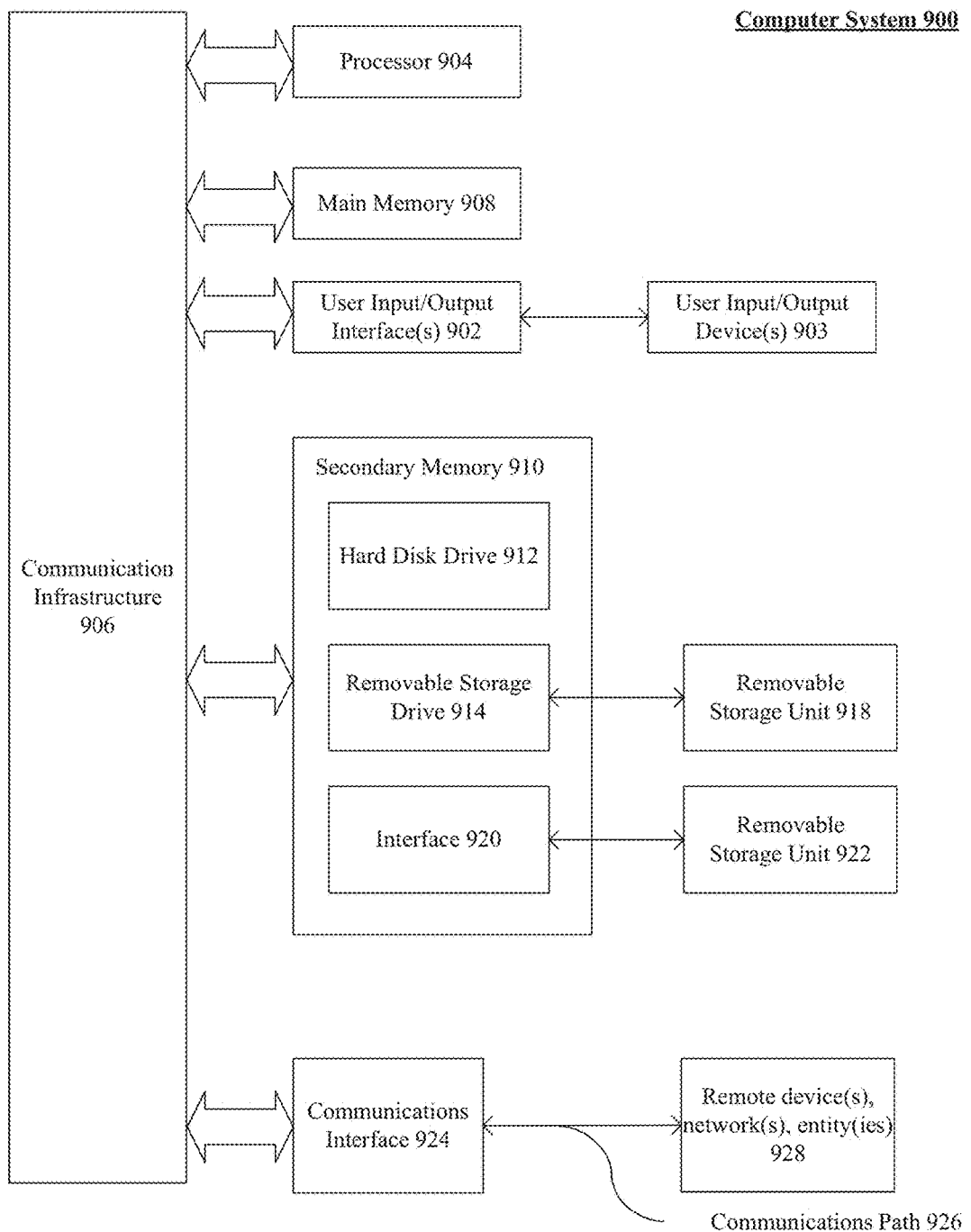
FIG. 9 illustrates an example computer system useful for implementing various embodiments.

FIG. 8 illustrates an example method 800 for publishing a message to a global event stream, according to an embodiment. It is to be appreciated that not all steps may be needed to perform the disclosure provided herein. Further, some of the steps may be performed simultaneously, or in a different order than shown in FIG. 8, as will be understood by a person of ordinary skill in the art.

Method 800 begins at stage 802 by retrieving a message from the event publish queue, for example event publish queue 422 of FIG. 4. In an embodiment, the retrieval may be performed by a stream publisher, such as stream publisher 440 of FIG. 4. The stream publisher may periodically poll the event publish queue for the message and retrieve the message once detected. Additionally or alternatively, the event publish queue may push the message to the stream publisher, either periodically in a batch of messages or upon receipt into the event publish queue.

At stage 804, transformation rules may be applied to the message to produce a transformed message. In an embodiment, the stream publisher may query a service data cache, such as service data cache 424 of FIG. 4, and/or a service data store, such as service data store 432 of FIG. 4, for additional detail pertinent to the message. In an embodiment, the additional pertinent detail may include, for example and without limitation, an event type or message type, a category of message types, the source of the message, a timestamp of the message (e.g., time of transmission or receipt), and message tags. This detail may be organized and retrieved in a hierarchical fashion to add layers of context to the message.

For example, a first contextual layer may be representative of an application contextual layer, which may include, without limitation, information regarding the container application and/or native application executing the service emitting the message. A second contextual layer, for example, may be representative of a group contextual layer, which may include, without limitation, information regarding a set or a group of one or more container applications and/or native applications that may be operatively and/or communicatively coupled together to provide the service emitting the message.

A third contextual layer may be representative of a service contextual layer, which may include, without limitation, information regarding the service emitting the message. A fourth contextual layer may be representative of a node contextual layer, which may include, without limitation, information regarding the one or more cluster node(s) hosting or otherwise executing the service and container application and/or native application executing the service.

A fifth contextual layer may be representative of a cluster contextual layer, which may include, without limitation, information regarding a cluster that includes the one or more cluster node(s) hosting or otherwise executing the service emitting the message. A sixth contextual layer may be representative of a tenant contextual layer which may include, without limitation, information regarding the tenant that is associated with the service emitting the message.

In an embodiment, the stream publisher may retrieve additional pertinent detail from each contextual layer to be added to the message. For example, the source of the message may include information about the service emitting the message, container application and/or native application executing the service, the cluster node(s) executing the container application, the cluster containing the cluster node(s), and a tenant associated with the service. Similarly, descriptive tags from each hierarchical level may be added to the message to provide further context to message recipients. One of skill in the art will appreciate that data may be organized into different contextual layers and is not limited to the above examples.

Once all pertinent detail has been retrieved, the stream publisher may apply the transformation rules to produce a transformed message by adding the additional pertinent detail to the message and formatting the message for dissemination to a global event stream, such as global event stream 450 of FIG. 4. At stage 806, the transformed message may be published to the global event stream, which may transmit the message to related services and applications for appropriate action. Finally, at stage 808, the message may be deleted from the event publish queue after being transmitted to the global event stream.

Example Computer System

Various embodiments and components therein can be implemented, for example, using one or more well-known computer systems, such as, for example, platform server devices 164, development devices 104, consumer devices 108, server devices 122, and server devices 124 of FIG. 1. Computer system 700 can be any well-known computer capable of performing the functions described herein.

Computer system 700 includes one or more processors (also called central processing units, or CPUs), such as a processor 704. Processor 704 is connected to a communication infrastructure or bus 706.

One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communications path 726.

In an embodiment, a tangible apparatus or article of manufacture comprising a tangible computer useable or readable medium having control logic (software) stored thereon is also referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 7. In particular, embodiments may operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventors, and thus, are not intended to limit the disclosure or the appended claims in any way.

While the invention has been described herein with reference to exemplary embodiments for exemplary fields and applications, it should be understood that the invention is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of the disclosure should not be limited by any of the above-described exemplary embodiments, but should be defined only in accordance with the following claims and their equivalents.

What is claimed is:

1. A system for management of a deployment, the system comprising:
   at least one processor; and
   a memory operatively coupled to the at least one processor, the at least one processor configured at least in part to:
   receive, by a command application programming interface (API) of a service, a request for the service from a client device;
   generate, by the command API, a task message and a request identifier based on the request, the task message specifying a task to be performed by the service;
   update, by the command API, a read cache, accessible by a worker process and by the command API, to include the request identifier;
   transmit, by the command API, the task message to a command task queue;
   detect, by the worker process of the service, the task message upon transmission of the task message to the command task queue;
   receive, by a stream listener of the service, a published message from an event stream, wherein the event stream comprises communication across a plurality of related services, applications, or a combination thereof, wherein the stream listener is configured to subscribe to the event stream, and wherein multiple instances of the command API, worker process, or stream listener are configured for parallel execution and load balancing;

apply, by the stream listener, one or more filtering rules to the published message to determine whether the published message is relevant to the service;
execute, by the worker process, the task specified by the task message; and
transmit, by the worker process, a completion message to an event publish queue upon completion of the task specified by the task message.

2. The system of claim 1, wherein the at least one processor is further configured to:
periodically transmit, by the worker process, a status of the task specified by the task message to a read queue;
receive, by a read API, a status request including the request identifier from the client device;
retrieve, by the read API, the status from the read queue in response to receiving the status request; and
transmit, by the read API, the status to the client device.

3. The system of claim 1, wherein the at least one processor is further configured to:
receive, by a read API, a request for data provided by the service;
validate, by the read API, credentials associated with the request for data to determine whether the request for data is authorized to access the requested data;
verify, by the read API, that a request format of the request for data meets one or more predefined format requirements;
retrieve, by the read API, the requested data from the read cache;
retrieve, by the read API, the requested data from a service data store associated with the service when the requested data does not reside in the read cache;
format, by the read API, the requested data according to a service contract associated with the service and the client device; and
transmit, by the read API, the requested data to the client device.

4. The system of claim 3, wherein the at least one processor is further configured to:
transmit, by the read API, an update message to the command task queue when the requested data does not reside in the read cache, wherein the update message specifies an update task to refresh the read cache with the requested data;
detect, by the worker process, the update message upon transmission of the update message to the command task queue; and
execute, by the worker process, the update task specified by the update message to refresh the read cache with the requested data.

5. The system of claim 1, wherein, to execute the task specified by the task message, the at least one processor is further configured to:
retrieve, by the worker process, cached data associated with the task specified by the task message from a service data cache, wherein the service data cache stores data reusable by the service for a plurality of service requests; and
update, by the worker process, the service data cache upon completion of the task specified by the task message.

6. The system of claim 1, wherein, to execute the task specified by the task message, the at least one processor is further configured to:
determine, by the worker process, task data required to perform the task specified by the task message;
retrieve, by the worker process, the task data from a service data store associated with the service;
execute, by the worker process, one or more predefined instructions upon the retrieved data to generate task result data; and
update, by the worker process, the read cache with the task result data for access by the client device.

7. The system of claim 1, wherein the at least one processor is further configured to:
retrieve, by a stream publisher, a message from the event publish queue;
apply, by the stream publisher, one or more transformation rules to the message to produce a transformed message; and
publish, by the stream publisher, the transformed message to the event stream.

8. The system of claim 1, wherein the at least one processor is further configured to:
determine, by the stream listener, whether the published message requires the task to be performed by the service; and
transmit, by the stream listener, the published message to the command task queue in response to determining that the published message requires the task to be performed by the service.

9. The system of claim 1, wherein the request is routed via an API gateway to the command API.

10. A computer-implemented method for managing a deployment, the method comprising:
receiving, by a command application programming interface (API) of a service, a request for the service from a client device;
generating a task message and a request identifier based on the request, the task message specifying a task to be performed by the service;
updating a read cache, accessible by a worker process and by the command API, to include the request identifier;
transmitting the task message to a command task queue of the service;
detecting, by the worker process of the service, the task message upon transmission of the task message to the command task queue of the service;
receiving, by a stream listener of the service, a published message from an event stream, wherein the event stream comprises communication across a plurality of related services, applications, or a combination thereof, wherein the stream listener is configured to subscribe to the event stream, and wherein multiple instances of the command API, worker process, or stream listener are configured for parallel execution and load balancing;
applying, by the stream listener, one or more filtering rules to the published message to determine whether the published message is relevant to the service;
executing the task specified by the task message; and
transmitting a completion message to an event publish queue upon completion of the task specified by the task message.

11. The method of claim 10, further comprising:
periodically transmitting a status of the task specified by the task message to a read queue;
receiving, by a read API, a status request including the request identifier from the client device;
retrieving the status from the read queue in response to receiving the status request; and
transmitting the status to the client device.

12. The method of claim 10, further comprising:
receiving, by a read API, a request for data provided by the service;

validating credentials associated with the request for data to determine whether the request for data is authorized to access the requested data;
verifying that a request format of the request for data meets one or more predefined format requirements;
retrieving the requested data from the read cache;
retrieving the requested data from a service data store associated with the service when the requested data does not reside in the read cache;
formatting the requested data according to a service contract associated with the service: and
transmitting the requested data to the client device.

13. The method of claim 12, further comprising:
transmitting an update message to the command task queue when the requested data does not reside in the read cache, wherein the update message specifies an update task to refresh the read cache with the requested data;
detecting, by the worker process, the update message upon transmission of the update message to the command task queue; and
executing the update task specified by the update message to refresh the read cache with the requested data.

14. The method of claim 10, wherein executing the task specified by the task message further comprises:
retrieving cached data associated with the task specified by the task message from a service data cache, wherein the service data cache stores data reusable by the service for a plurality of service requests; and
updating the service data cache upon completion of the task specified by the task message.

15. The method of claim 10, wherein executing the task specified by the task message further comprises:
determining task data required to perform the task specified by the task message;
retrieving the task data from a service data store associated with the service;
executing one or more predefined instructions upon the retrieved data to generate task result data; and
updating the read cache with the task result data for access by the client device.

16. The method of claim 10, further comprising:
retrieving, by a stream publisher, a message from the event publish queue;
applying one or more transformation rules to the message to produce a transformed message; and
publishing the transformed message to the event stream.

17. The method of claim 10, further comprising:
determining whether the published message requires the task to be performed by the service; and
transmitting the published message to the command task queue in response to determining that the published message requires the task to be performed by the service.

18. The method of claim 10, wherein the request is routed via an API gateway to the command API.

19. A non-transitory tangible computer-readable storage device having instructions stored thereon that, when executed by at least one processor, cause the at least one processor to perform operations to manage a deployment, the operations comprising:
receiving, by a command application programming interface (API) of a service, a request for the service from a client device;
generating a task message and a request identifier based on the request, the task message specifying a task to be performed by the service;
updating a read cache, accessible by a worker process and by the command API, to include the request identifier;
transmitting the task message to a command task queue of the service;
detecting, by a worker process of the service, the task message upon transmission of the task message to the command task queue;
receiving a published message from an event stream, by a stream listener of the service, wherein the event stream comprises communication across a plurality of related services, applications, or a combination thereof, wherein the stream listener is configured to subscribe to the event stream, and wherein multiple instances of the command API, worker process, or stream listener are configured for parallel execution and load balancing;
applying one or more filtering rules to the published message to determine whether the published message is relevant to the service;
executing the task specified by the task message; and
transmitting a completion message to an event publish queue upon completion of the task specified by the task message.

20. The non-transitory computer-readable storage device of claim 19, the operations further comprising:
receiving, by a read API, a request for data provided by the service;
validating credentials associated with the request for data to determine whether the request is authorized to access the requested data;
verifying that a request format of the request for data meets one or more predefined format requirements;
retrieving the requested data from the read cache;
retrieving the requested data from a service data store associated with the service when the requested data does not reside in the read cache;
formatting the requested data according to a service contract associated with the service; and
transmitting the requested data to the client device.

* * * * *